United States Patent
Sano et al.

(10) Patent No.: US 9,319,497 B2
(45) Date of Patent: Apr. 19, 2016

(54) PORTABLE TERMINAL
(71) Applicant: Sony Mobile Communications, Inc., Tokyo (JP)
(72) Inventors: Tatsuya Sano, Tokyo (JP); Naka Shibata, Lund (SE)
(73) Assignees: Sony Corporation, Tokyo (JP); Sony Mobile Communications Inc., Tokyo (JP)
( * ) Notice: Subject to any disclaimer, the term of this patent is extended or adjusted under 35 U.S.C. 154(b) by 142 days.
(21) Appl. No.: 14/142,214
(22) Filed: Dec. 27, 2013

(65) Prior Publication Data
US 2014/0187296 A1 Jul. 3, 2014

Related U.S. Application Data
(60) Provisional application No. 61/748,312, filed on Jan. 2, 2013.

(51) Int. Cl.
 *H04M 1/02* (2006.01)
(52) U.S. Cl.
 CPC .......... *H04M 1/0216* (2013.01); *H04M 1/0245* (2013.01); *H04M 2250/22* (2013.01)
(58) Field of Classification Search
 CPC ............ H04M 1/0214; H04M 1/0216; H04M 1/0245; H04M 2250/22
 USPC ......... 455/575.3, 566, 575.1, 90.3, 569.1, 82, 455/277.1, 575.4, 575.6, 575.8; 361/807, 361/679.21; 345/173, 156, 1.3, 1.1; 348/240.99, 222.1, 333.01; 74/101; 715/700
 See application file for complete search history.

(56) References Cited

U.S. PATENT DOCUMENTS

| | | | | |
|---|---|---|---|---|
| 4,714,286 A * | 12/1987 | Yamamoto | | 292/263 |
| 7,711,112 B2 * | 5/2010 | Satoh | | G06F 1/1616 |
| | | | | 16/367 |
| 8,755,181 B2 * | 6/2014 | Okutsu | | G06F 1/1616 |
| | | | | 361/679.55 |
| 2004/0214610 A1 * | 10/2004 | Tanemura et al. | | 455/566 |
| 2005/0153668 A1 * | 7/2005 | Lee | | 455/90.3 |
| 2005/0177978 A1 * | 8/2005 | Satoh et al. | | 16/319 |
| 2005/0243997 A1 * | 11/2005 | Zou | | H04M 1/0222 |
| | | | | 379/433.13 |
| 2008/0311958 A1 * | 12/2008 | Oswald et al. | | 455/566 |
| 2010/0039372 A1 * | 2/2010 | Futter | | 345/156 |
| 2011/0042994 A1 * | 2/2011 | Saito et al. | | 296/65.13 |
| 2011/0162470 A1 * | 7/2011 | Sano et al. | | 74/101 |
| 2011/0263304 A1 * | 10/2011 | Laido | | G06F 1/1616 |
| | | | | 455/575.3 |
| 2012/0034955 A1 * | 2/2012 | Ahn | | H04M 1/0212 |
| | | | | 455/566 |
| 2012/0262857 A1 * | 10/2012 | Fukaya | | H04M 1/0216 |
| | | | | 361/679.01 |
| 2013/0100060 A1 * | 4/2013 | Iwaizumi | | 345/173 |
| 2013/0169564 A1 * | 7/2013 | Sano et al. | | 345/173 |
| 2013/0314570 A1 * | 11/2013 | Imaizumi et al. | | 348/240.99 |
| 2013/0314577 A1 * | 11/2013 | Imaizumi et al. | | 348/333.01 |
| 2014/0328041 A1 * | 11/2014 | Rothkopf et al. | | 361/807 |

FOREIGN PATENT DOCUMENTS

JP 2009-187290 A 8/2009

OTHER PUBLICATIONS

URL: http://plusd.itmedia.co.jp/mobile/articles/1202/22/news137.html with English abstract, pp. 4, Jan. 20, 2014.

* cited by examiner

*Primary Examiner* — Tan H Trinh
(74) *Attorney, Agent, or Firm* — Oblon, McClelland, Maier & Neustadt, L.L.P.

(57) ABSTRACT

A portable terminal including a first housing including a first display; a second housing including a second display; and a hinge portion that couples the first housing and the second housing so as to be openable and closable with respective opposing end portions of the first housing and the second housing adjacent to each other and with respective surfaces of the first housing and the second housing positioned in the same plane as each other in an open state. The hinge portion is disposed so as to not be visible from a front side of the first display and the second display when the first housing and the second housing are in the open state.

21 Claims, 30 Drawing Sheets

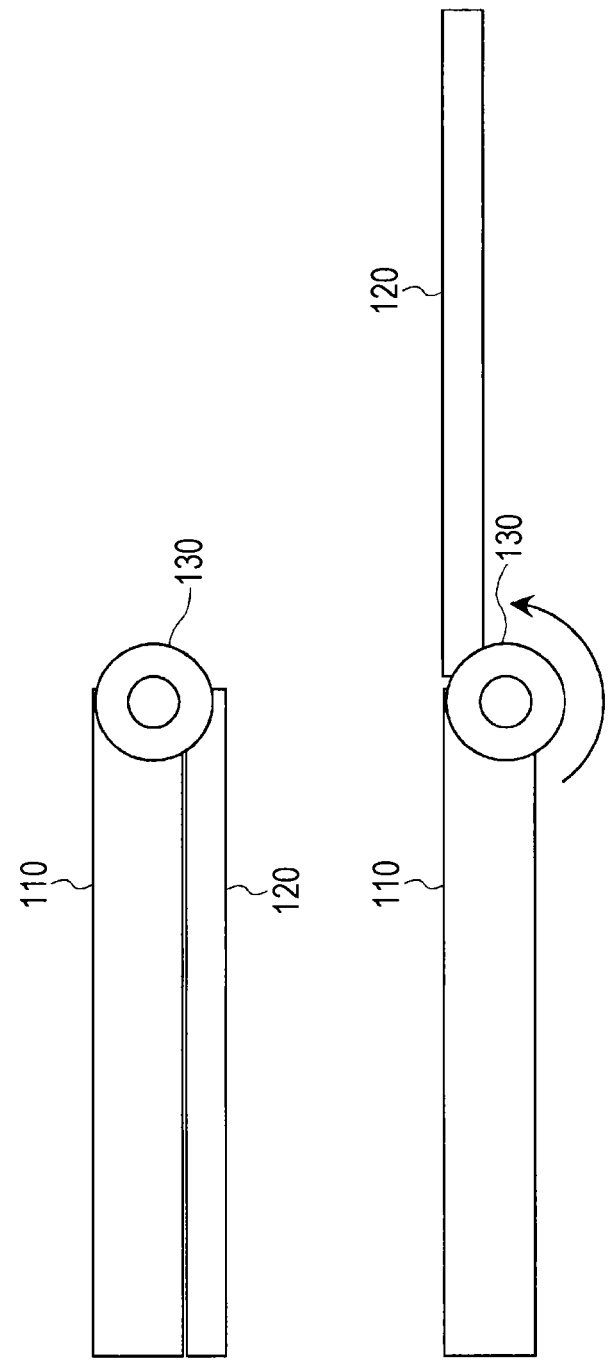

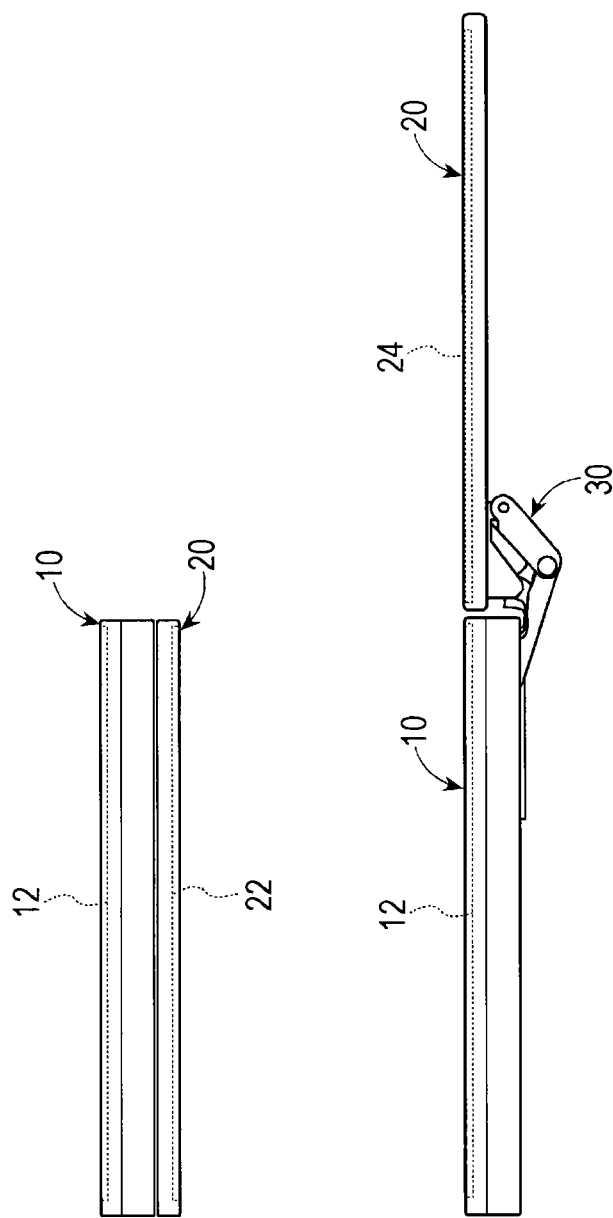

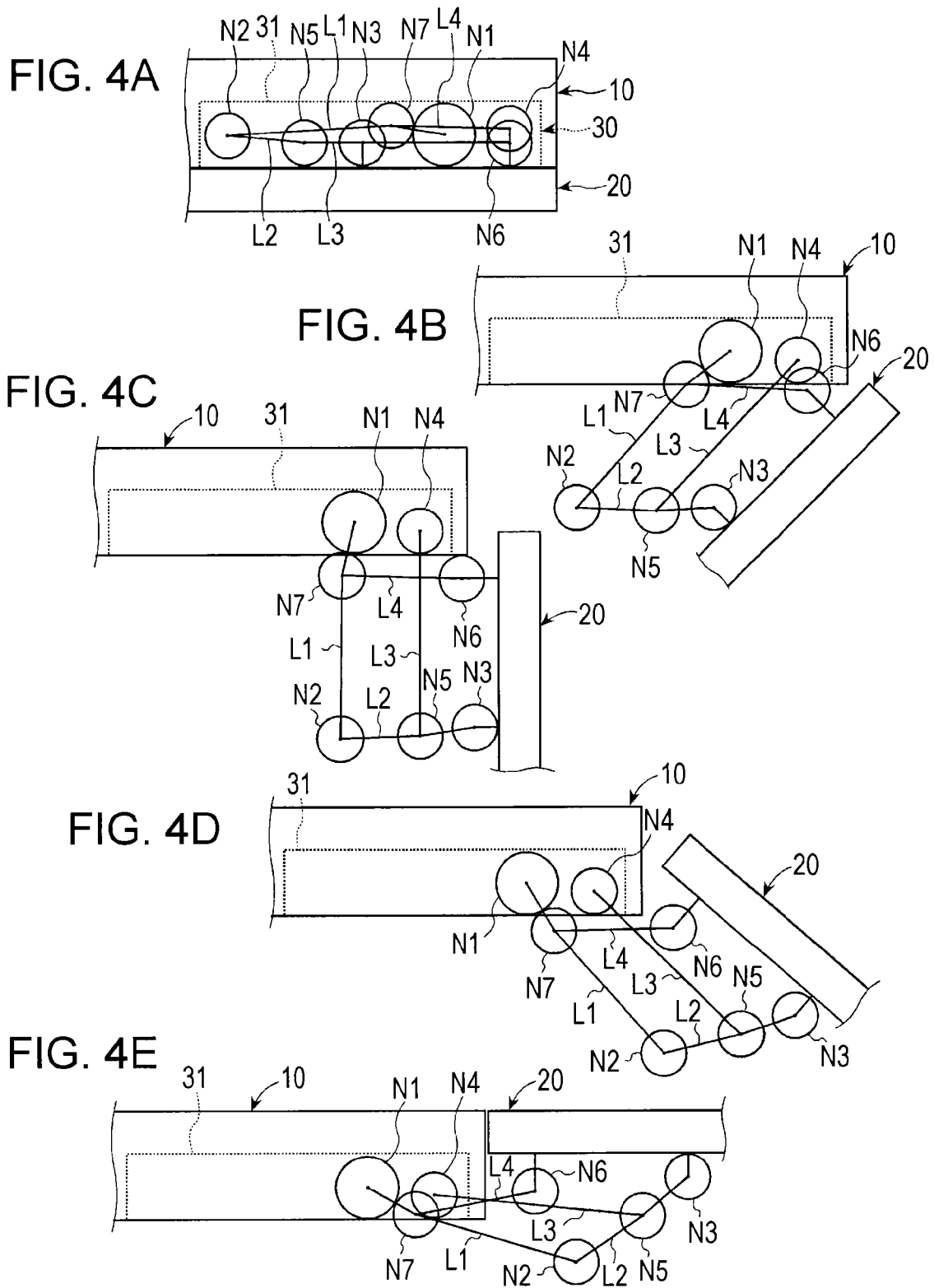

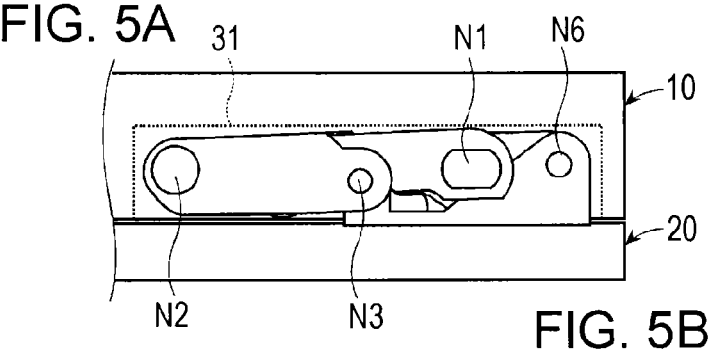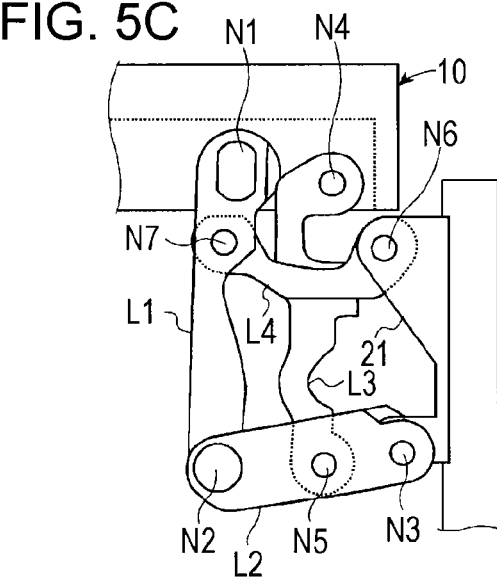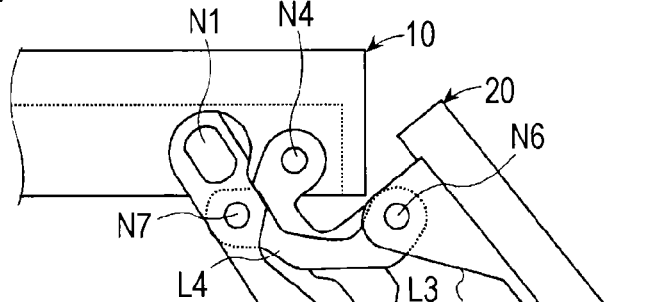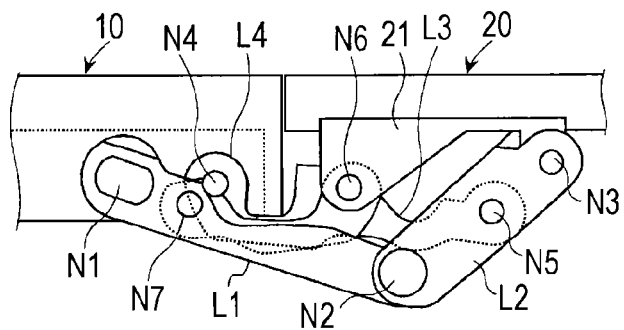

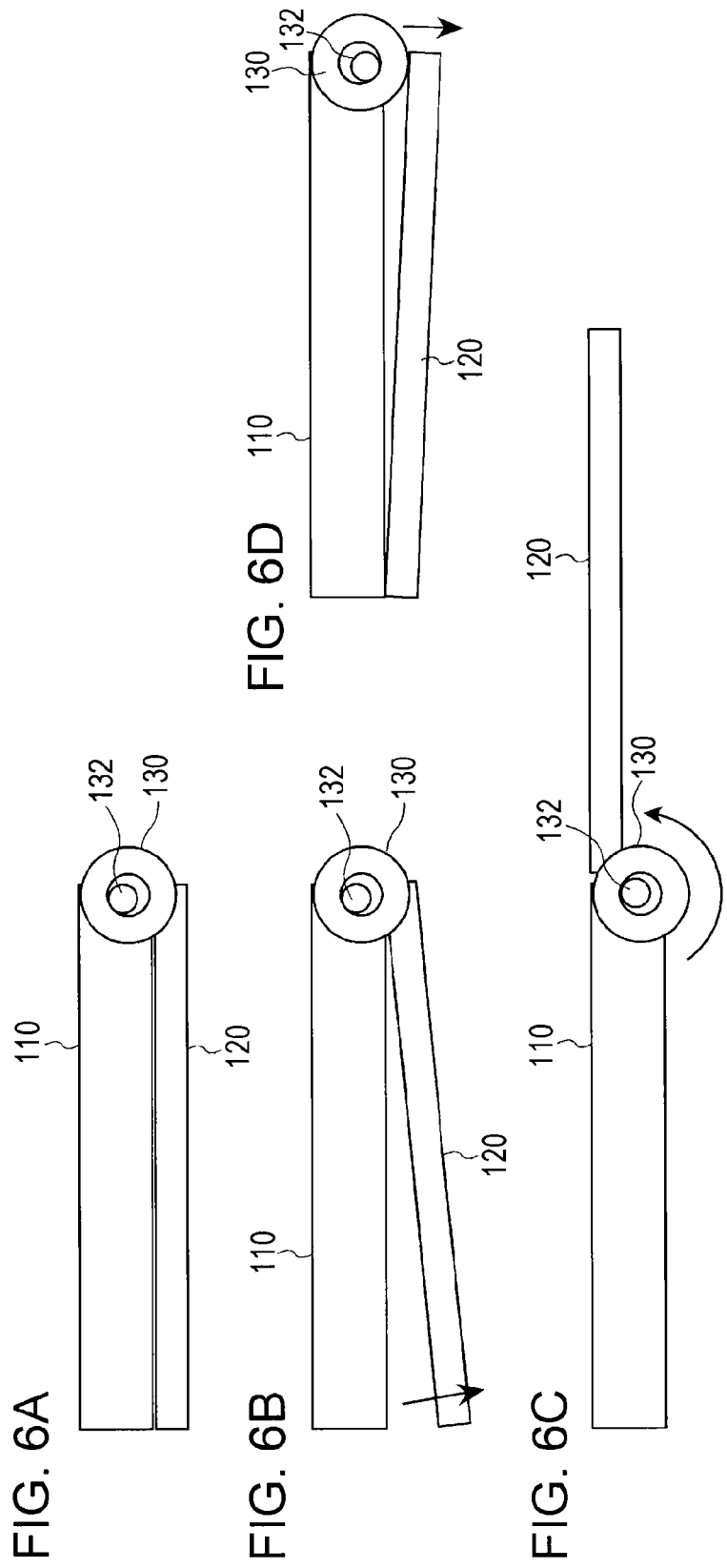

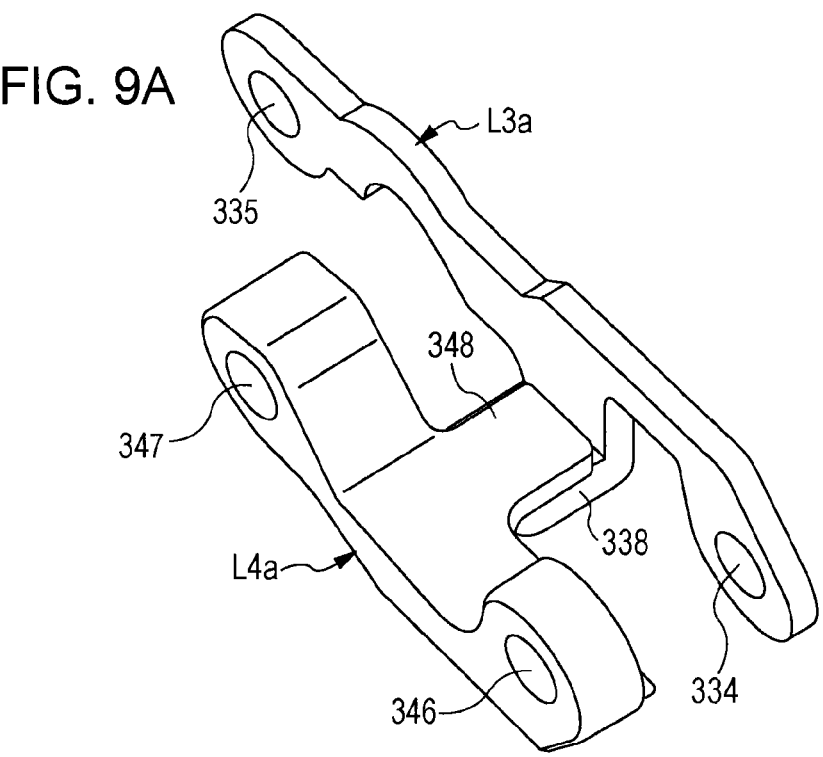
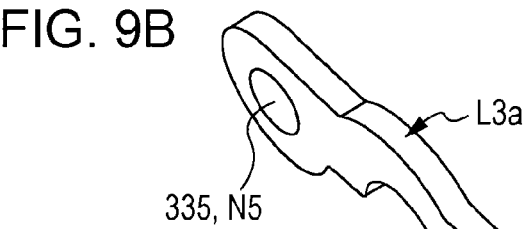
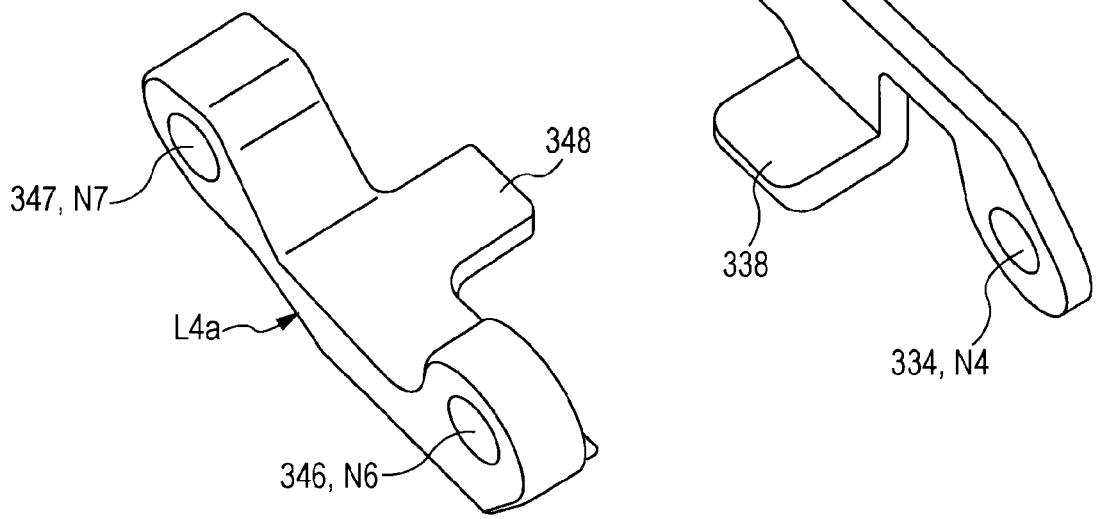

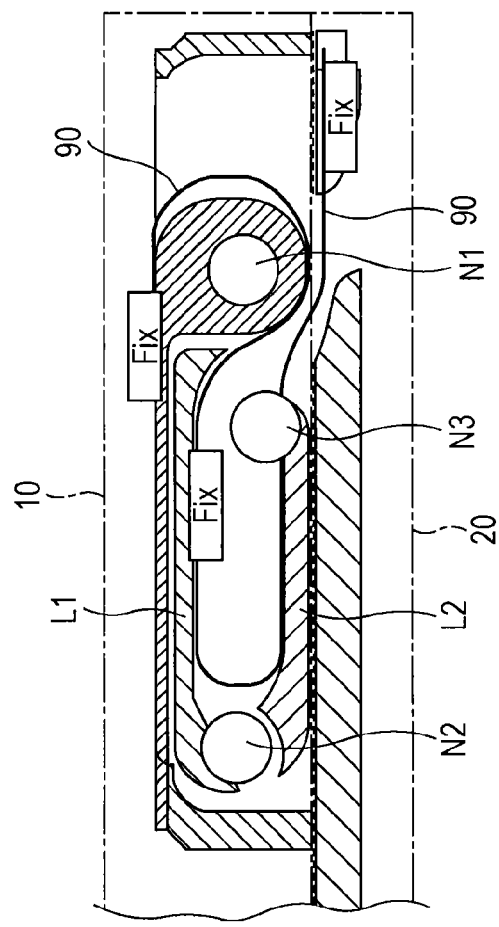
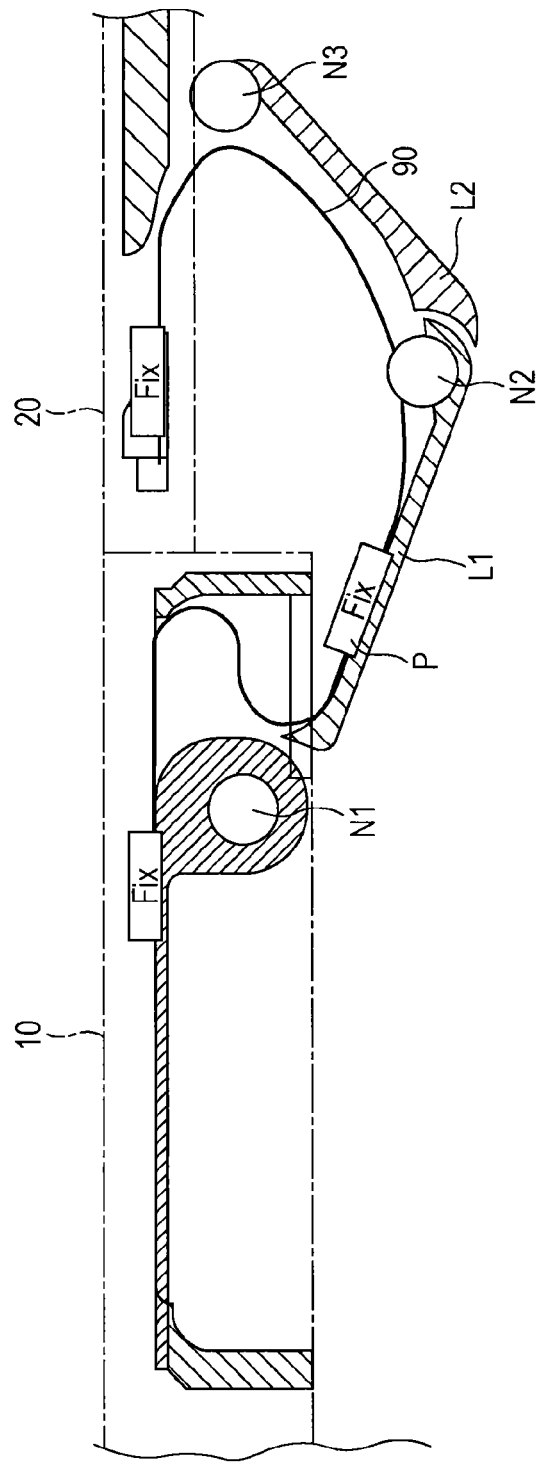
FIG. 26A
FIG. 26B

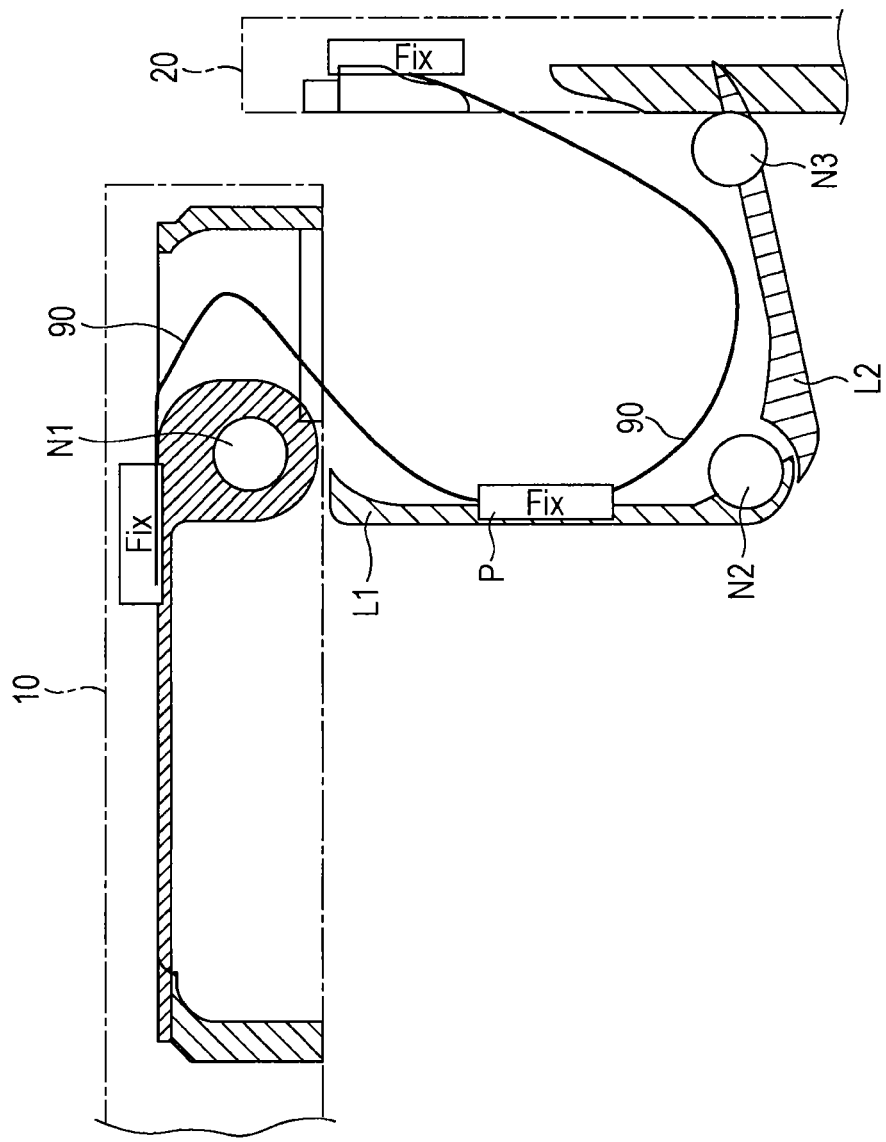

PORTABLE TERMINAL

CROSS REFERENCE TO RELATED APPLICATION

The present application claims the benefit of the earlier filing date of U.S. Provisional Patent Application Ser. No. 61/748,312 filed on Jan. 2, 2013, the entire contents of which is incorporated herein by reference.

BACKGROUND

1. Field of the Disclosure

The present invention relates to a portable terminal including a first housing and a second housing coupled by a hinge portion.

2. Description of Related Art

In recent years, portable terminals called "smartphones" have been rapidly increasingly used. Such a portable terminal includes a display portion having a display screen with a touch detection function. A user may perform a touch operation on the display screen to input various commands and information to the portable terminal.

Such a configuration enables removal of a hardware numeric keypad from the portable terminal. This allows so-called straight-type portable terminals to include a relatively large display screen.

There has hitherto been proposed a portable terminal such as a gaming device including a display screen on the front side of a housing and a touch sensor on the back side of the housing to provide an extended input function (see Patent Literature 1). The display screen is not significantly different from the size of the straight-type portable terminals.

Meanwhile, portable terminals called "tablet terminals" or "tablet-type terminals" that include a display screen with a touch detection function that is larger in size than that of the smartphones are also available in the market.

SUMMARY

However, the tablet terminals inevitably have a large housing to accommodate a display device having a large display screen, and are less portable than the smartphones.

In order to address such an issue, a terminal model in a foldable and dual-screen body has been proposed to fulfill two requirements, namely portability and a large display screen, at the same time. The terminal model may be utilized in a smartphone style in a folded state (closed state) and in a tablet style in the open state to provide a large screen area.

FIGS. 1A and 1B are each a side view of a foldable portable terminal according to the related art including a first housing 110 and a second housing 120 in the closed state and the open state, respectively. In order to use the portable terminal as a tablet terminal, it is necessary that the respective display screens of the first housing 110 and the second housing 120 with a touch function should be arranged side by side in the same plane with the two housings open at 180° as shown in FIG. 1B. Therefore, if a hinge according to the related art is utilized, a hinge portion 130 inevitably projects form one side of the portable terminal in the closed state as shown at the right end of FIG. 1A. Such a projection formed by the hinge portion may disadvantageously impair the appearance of the portable terminal in the closed state to degrade the design quality.

The inventors recognize that a portable terminal that includes a first housing and a second housing coupled by a hinge portion needs a new configuration that allows respective display screens of the two housings to be arranged in the same plane in the open state without the hinge portion projecting from one side of the terminal in the closed state.

According to an embodiment of the present invention there is provided a portable terminal including a first housing including a first display; a second housing including a second display; and a hinge portion that couples the first housing and the second housing so as to be openable and closable with respective opposing end portions of the first housing and the second housing adjacent to each other and with respective surfaces of the first housing and the second housing positioned in the same plane as each other in an open state. The hinge portion is disposed so as to not be visible from a front side of the first display and the second display when the first housing and the second housing are in the open state.

BRIEF DESCRIPTION OF DRAWINGS

FIGS. 1A and 1B are each a side view of a foldable portable terminal according to the related art including a first housing and a second housing in the closed state and the open state, respectively.

FIGS. 3A and 3B are each a side view of the portable terminal according to the embodiment of the present invention in the closed state and the open state, respectively.

FIGS. 4A to 4E show a first arm L1 to a fourth arm L4 of a link mechanism forming a hinge portion according to the embodiment of the present invention in a simplified manner using lines, showing changes from the closed state to the open state through transient states.

FIGS. 5A to 5E are each a side view of a specific link mechanism corresponding to FIGS. 4A to 4E, respectively.

FIGS. 6A to 6D show a portable terminal having a hinge portion according to the related art in various states.

FIGS. 9A, 9B, and 9C are each a perspective view showing a third arm L3$a$ and a fourth arm L4$a$ extracted from the link mechanism and the third arm L3$a$ and the fourth arm L4$a$, respectively, independently.

FIGS. 26A and 26B are each a schematic side view of an essential portion of a portable terminal at an opening angle of 0° and 180°, respectively.

FIG. 27 is a schematic side view of the essential portion of the portable terminal at an opening angle of 90°.

DETAILED DESCRIPTION

Embodiments of the present invention will be described in detail below with reference to the drawings.

First Embodiment

Figure 2A:
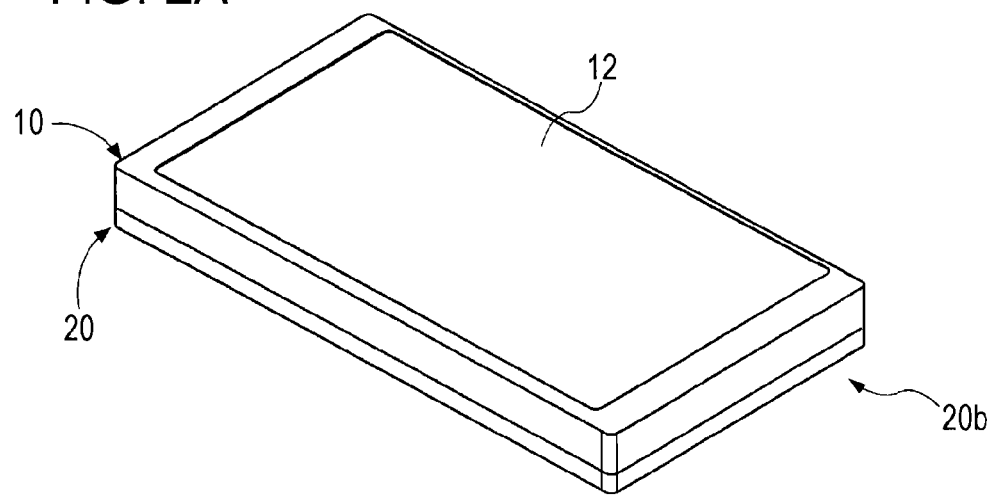
FIGS. 2A and 2B are each a perspective view of a portable terminal according to an embodiment of the present invention in the closed state and the open state, respectively.
Figure 2B:
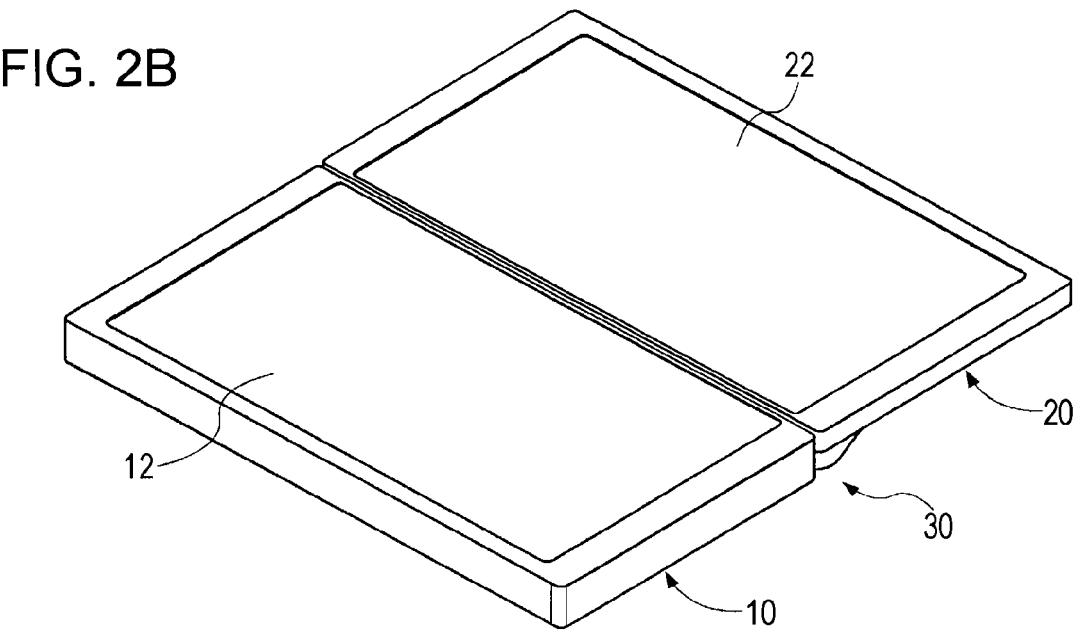

FIGS. 2A and 2B are each a perspective view of a portable terminal according to an embodiment in the closed state and the open state, respectively.

FIGS. 3A and 3B are each a side view of the portable terminal according to the embodiment in the closed state and the open state, respectively.

A first housing 10 includes a first display portion 12 having a substantially rectangular first display screen. Similarly, a second housing 20 includes a second display portion 22 having a substantially rectangular second display screen. The first housing 10 and the second housing 20 are coupled by a hinge portion 30 so as to be openable and closable with their respective sides (in the example, long sides) opposing each other. That is, the hinge portion 30 rotatably couples the first housing 10 and the second housing 20 such that both the first and second display screens are exposed to the outside in the closed state and the first and second display screens are positioned adjacent to each other in substantially the same plane in the open state.

In the embodiment, each of the first display portion 12 and the second display portion 22 serves as a touch panel for touch detection that overlaps the entirety or a part of the display region, although such a configuration is not essential to the present invention. Instead, only the second display portion 22 may include a touch panel.

As seen from a comparison between FIG. 1A and FIG. 3A, the portable terminal according to the embodiment shown in FIG. 3A does not have a protrusion at a side portion (at the right end in the drawing) of the terminal in the closed state. As shown in FIG. 3B, a protrusion that is substantially V-shaped as seen from a side appears on the lower side of the joint between the housing 10 and the housing 20 in the open state. The protrusion is not particularly disadvantageous in terms of appearance because the projection is positioned at the back of the two housings in the open state when a user is looking straight at the display screens.

FIGS. 4A to 4E show a first arm L1 to a fourth arm L4 of a specific link mechanism forming the hinge portion 30 of the portable terminal according to the embodiment in a simplified manner using lines, showing changes from the closed state to the open state through transient states. The opening angle between the first housing 10 and the second housing 20 is 0° in the closed state, and 180° in the open state. FIGS. 4B, 4C, and 4D each show a transient state at an opening angle of 45°, 90°, and 135°, respectively.

The hinge portion 30 includes a first arm L1, a second arm L2, a third arm L3, and a fourth arm L4 as first to fourth arm members, respectively, forming links of the link mechanism. Points at which end portions of the arms (links) are rotatably supported are indicated as nodes N1 to N7.

Herein, end portions of the two housings that oppose each other in the open state are referred to as "opposing end portions". One end of the first arm L1 is rotatably supported at a first location (corresponding to N1) of the first housing 10 in the vicinity of the opposing end portion.

One end of the second arm L2 is rotatably supported at a first location (corresponding to N3) of the second housing 20 in the vicinity of the opposing end portion. The other end (corresponding to N2) of the second arm L2 is rotatably coupled to the other end of the first arm L1.

One end of the third arm L3 is rotatably supported at a second location (corresponding to N4) of the first housing 10 closer to the opposing end portion than the first location. The other end of the third arm L3 is rotatably supported at an intermediate location (corresponding to N5) of the second arm L2. Here, the term "intermediate location" refers to a position between both ends of an arm.

One end of the fourth arm L4 is rotatably supported at a second location (corresponding to N6) of the second housing 20 closer to the opposing end portion than the first location. The other end of the fourth arm L4 is rotatably supported at an intermediate location (corresponding to N7) of the first arm L1.

In the embodiment, a support member 21 is used to rotatably support the second arm L2 and the fourth arm L4 with respect to the second housing 20. The support member 21 is fixed to the second housing 20 by a fixation member such as a screw (not shown). The support member 21 may be dispensed with depending on the shape or structure of the second housing 20.

FIGS. 5A to 5E are each a side view of a specific link mechanism corresponding to FIGS. 4A to 4E, respectively. It is seen that the link mechanism shown in the drawing can rotatably couple the first housing 10 and the second housing 20 such that the first and second display screens are positioned adjacent to each other in substantially the same plane in the open state. No protruding portion is provided at a side in the closed state. A downward protrusion formed by the hinge portion 30 in the open state has a relatively simple V shape formed by the first arm L1 and the second arm L2 (see FIG. 3B). In the open state, the fourth arm L4 and the third arm L3 are accommodated inside the link mechanism, and do not affect the appearance.

Second Embodiment

Next, a second embodiment of the present invention will be described. In the second embodiment, a reverse opening prevention function is added to the first embodiment as an additional function.

FIGS. 6A to 6D show a portable terminal having a hinge portion 130 according to the related art in various states. FIGS. 6A to 6C show ideal operation in which a housing 110 and a housing 120 of the portable terminal are transitioned from the closed state to the open state. In general, a movable mechanism is provided with an extra space called "clearance" to allow components to smoothly move relative to each other. Such an extra space may cause backlash. A so-called "reverse opening" phenomenon may be caused in a single-axis hinge according to the related art such as the hinge portion 130. The term "reverse opening" means a phenomenon in which respective end portions of the first housing 110 and the second housing 120 on the hinge portion 130 side are opened away from each other because of a gap between a rotary shaft (shaft) and a bearing with end portions of the two housings opposite to the hinge portion 130 kept closed in the closed state as shown in FIG. 6D.

If the number of shafts having a clearance is small, e.g. in case of a single-axis hinge, however, only slight reverse opening may be caused even if an external force that promotes reverse opening is exerted on the portable terminal as shown in FIG. 6D, which is not significantly disadvantageous. (In FIG. 6D, the angle of reverse opening is exaggerated.)

Figure 7A:
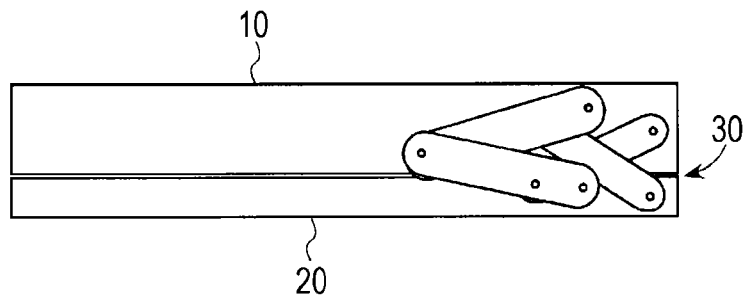
FIGS. 7A, 7B, and 7C illustrate a case where the effect of reverse opening of a hinge portion according to an embodiment of the present invention is unignorable.
Figure 7B:
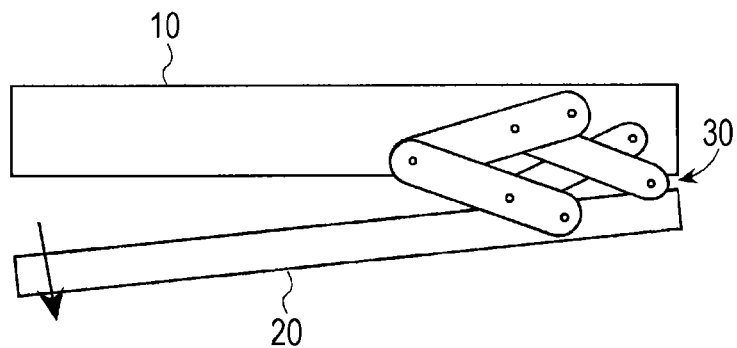
Figure 7C:
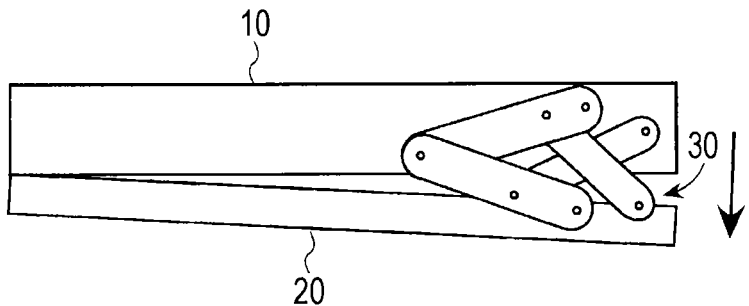

In contrast, the hinge portion 30 according to the embodiment serving as a link mechanism having a multiplicity of nodes schematically shown in FIG. 7A poses the following issue. That is, the effects of clearances may be built up (accumulated) to result in an unignorable effect of reverse opening as shown in FIG. 7C, depending on how an external force is exerted, besides normal opening operation shown in FIG. 7B.

Thus, the hinge portion according to the second embodiment is provided with a reverse opening prevention mechanism that restricts the amount of opening by which the respective opposing end portions of the first housing 10 and the second housing 20 are opened away from each other with end portions (that is, free end portions) of the two housings opposite to the opposing end portions kept closed in the closed state.

Figure 8A:
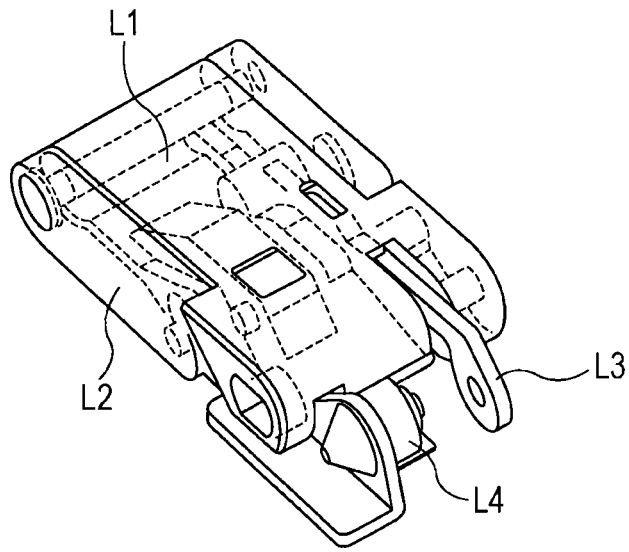
FIGS. 8A, 8B, and 8C are each a perspective view showing the appearance of a link mechanism forming the hinge portion in the closed state and a first arm L1 and a second arm L2 separated from the link mechanism, respectively.
Figure 8B:
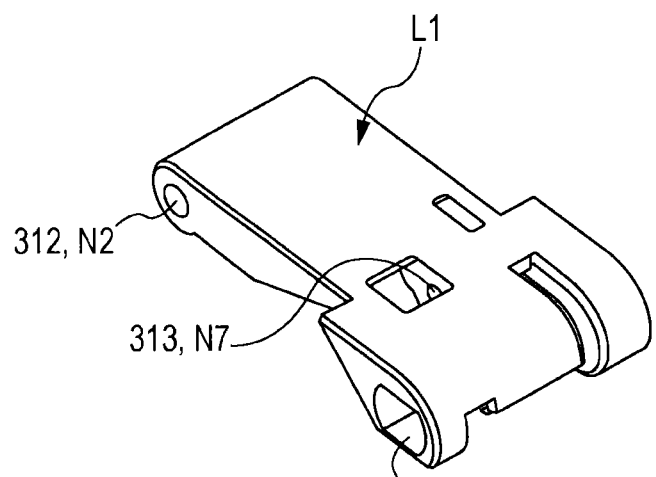
Figure 8C:
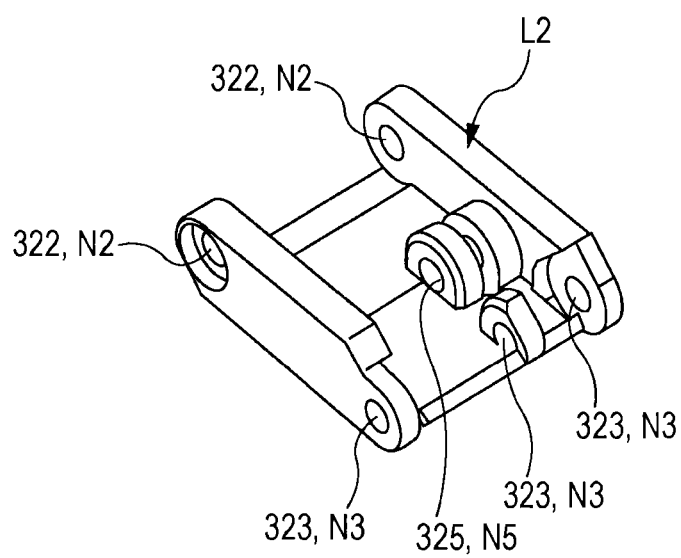

FIG. 8A is a perspective view showing the appearance of a link mechanism forming the hinge portion 30 in the closed state, and FIGS. 8B and 8C are each a perspective view showing the first arm L1 and the second arm L2, respectively, separated from the link mechanism. FIG. 9A is a perspective view showing a third arm L3a and a fourth arm L4a extracted from the link mechanism, and FIGS. 9B and 9C are each a perspective view showing the third arm L3a and the fourth arm L4a, respectively, independently.

As well seen in FIG. 8B, a shaft provided in the first housing is inserted into a shaft hole 311 at one end portion of the first arm L1. The shaft functions as the first node N1. A common shaft is inserted into a shaft hole 312 at the other end portion of the first arm L1 and shaft holes 322 of the second arm L2. The shaft functions as the second node N2. A shaft to be supported by a bearing of the support member 21 is inserted into shaft holes 323 of the second arm L2. The shaft functions as the third node N3.

As well seen in FIGS. 9A and 9B, a shaft to be fixed to the first housing is inserted into a shaft hole 334 of the third arm L3a. The shaft functions as the fourth node. A common shaft is inserted into a shaft hole 325 of the second arm L2 and a shaft hole 335 of the third arm L3a. The shaft functions as the node N5.

As well seen in FIGS. 9A and 9C, another shaft to be supported by the bearing of the support member 21 is inserted into a shaft hole 346 of the fourth arm L4a. The shaft functions as the sixth node N6. A shaft hole 347 of the fourth arm L4a is supported together with a shaft hole 313 of the first arm L1 by a common shaft. The shaft functions as the seventh node.

In the second embodiment, as well seen in FIGS. 9A to 9C, a first projecting portion 338 that projects in a lateral direction from an intermediate portion of the third arm L3a and a second projecting portion 348 that projects in a lateral direction from an intermediate portion of the fourth arm L4a are provided as elements forming the reverse opening prevention mechanism. Consequently, when the respective opposing end portions of the first housing 10 and the second housing 20 are urged to be opened away from each other with the free end portions of the two housings kept closed, the first projecting portion and the second projecting portion abut against each other to hinder such opening operation.

Figure 10:
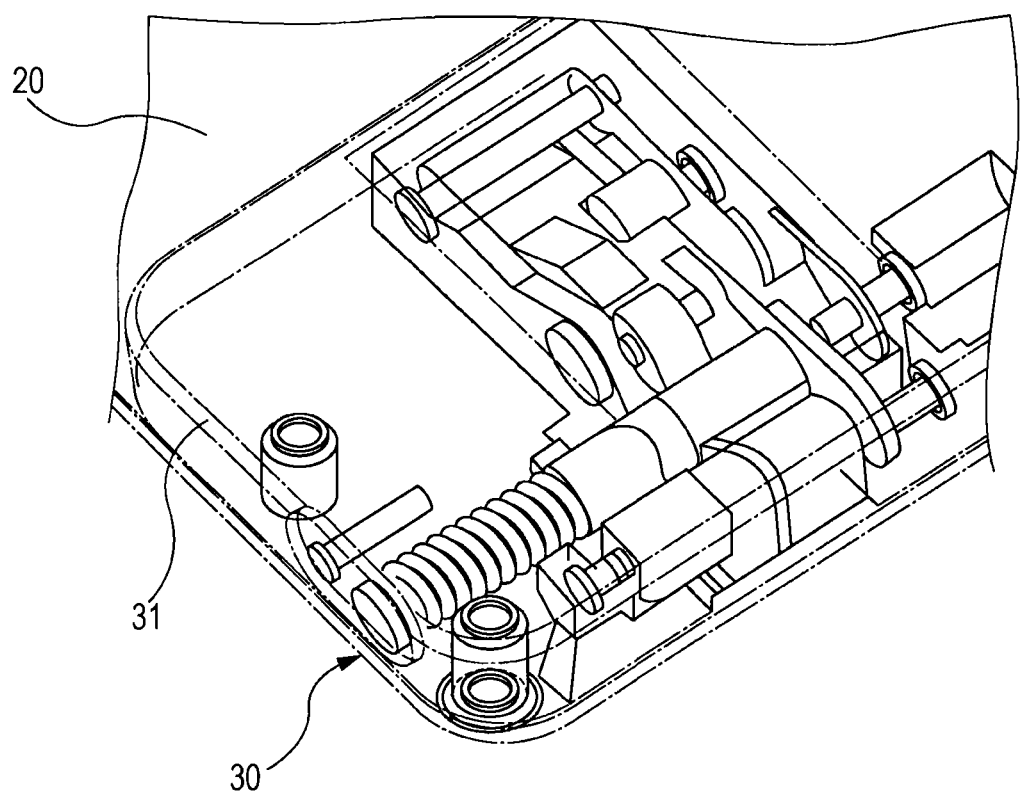
FIG. 10 is a partially cutaway perspective view of the hinge portion accommodated in a hinge cover.

FIG. 10 is a partially cutaway perspective view of the hinge portion 30 accommodated in a hinge cover 31. In the drawing, the hinge portion 30 provided inside is depicted as transparent from the outside of the hinge cover 31 for convenience. Practically, it is not necessary that the hinge cover 31 should be formed from a transparent material.

Figure 11A:
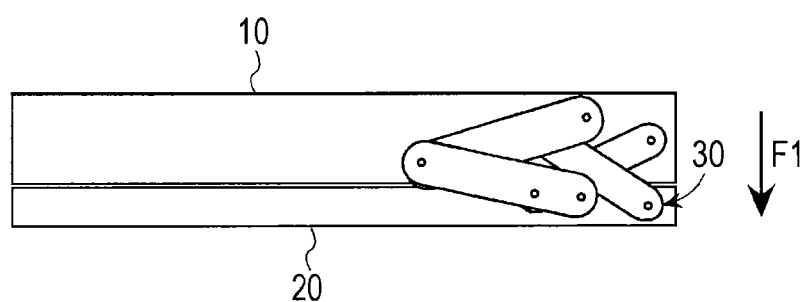
FIGS. 11A and 11B show how opening operation is hindered when an external force that urges respective opposing end portions of a first housing 10 and a second housing 20 to be opened away from each other is exerted with respective end portions of the first housing 10 and the second housing 20 opposite to the opposing end portions thereof kept closed.
Figure 11B:
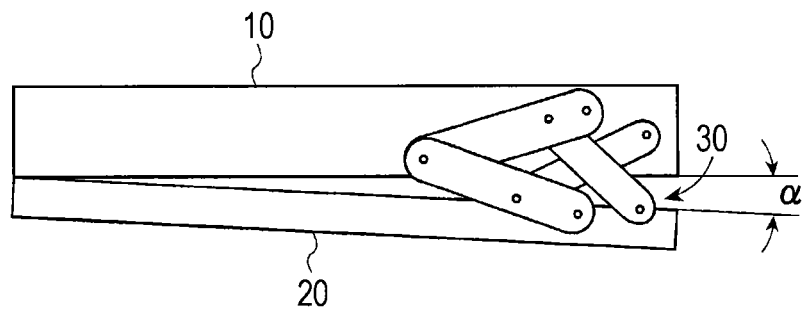

When an external force F1 is exerted to urge the respective opposing end portions of the first housing 10 and the second housing 20 to be opened away from each other with the free end portions of the two housings kept closed as shown in FIG. 11A, the first projecting portion 338 and the second projecting portion 348 abut against each other to at least hinder such opening operation to a prescribed angle α as shown in FIG. 11B.

Third Embodiment

Next, the configuration and operation of a hinge portion according to a third embodiment of the present invention will be described. The third embodiment is additionally provided with a drawing mechanism that generates a drawing force for the first housing 10 to draw the second housing 20 into the closed state when the first housing 10 and the second housing 20 are in a range in the vicinity of the closed state. That is, the drawing mechanism is a mechanism that generates a drawing force for bringing the opposing end portion of the second housing 20 closer to the opposing end portion of the first housing 10 when the first housing 10 and the second housing 20 are within a predetermined range proximate to the closed state.

Figure 12A:
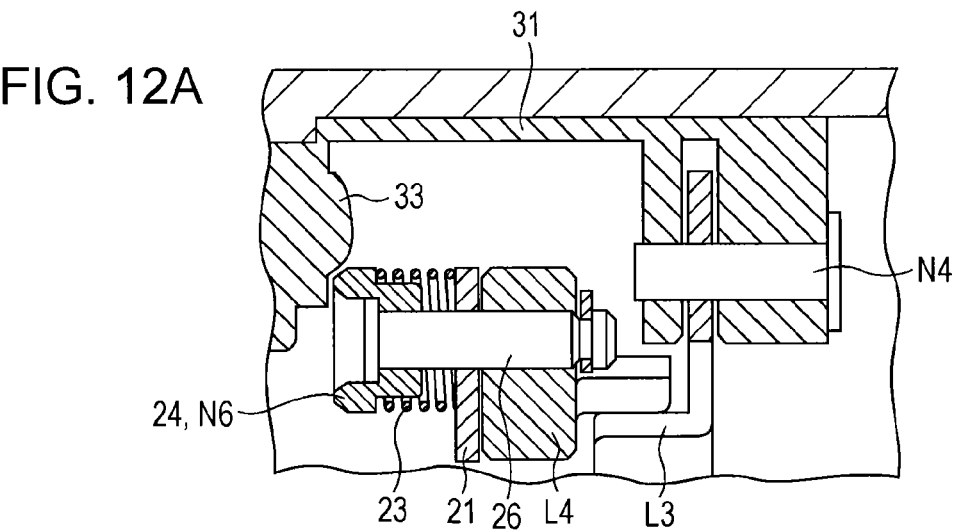
FIGS. 12A to 12C are each a cross-sectional view of a hinge portion illustrating a first configuration example of a drawing mechanism and operation of the drawing mechanism.
Figure 12B:
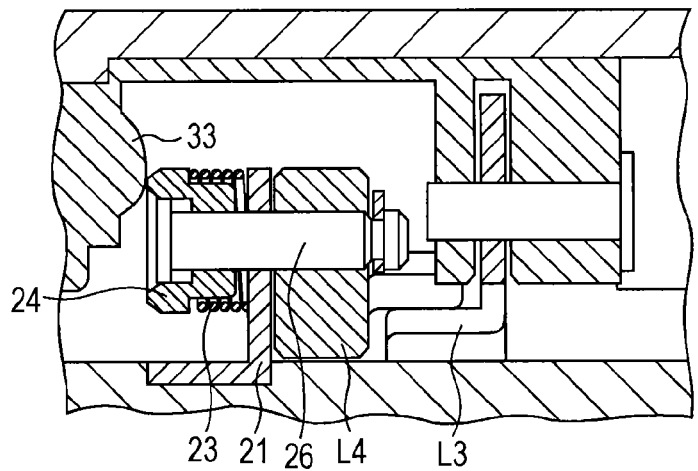
Figure 12C:
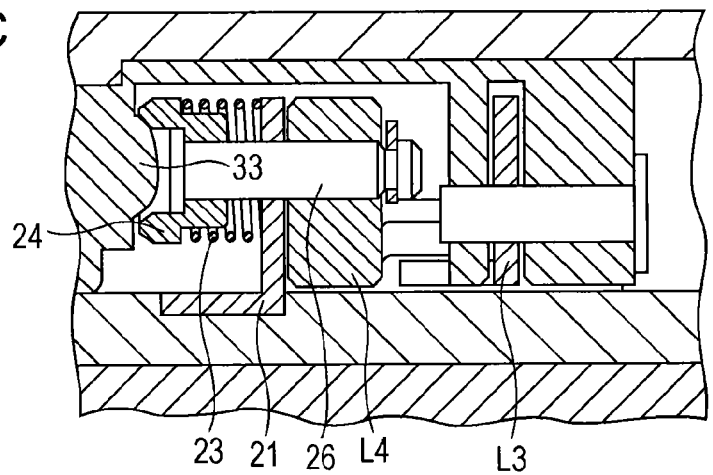

FIGS. 12A to 12C are each a cross-sectional view of a hinge portion illustrating a first configuration example of a drawing mechanism and operation of the drawing mechanism. The drawings are each a cross-sectional view including the node N6 of the hinge portion of the terminal. For ease of understanding, some elements are not shown.

Figure 13:
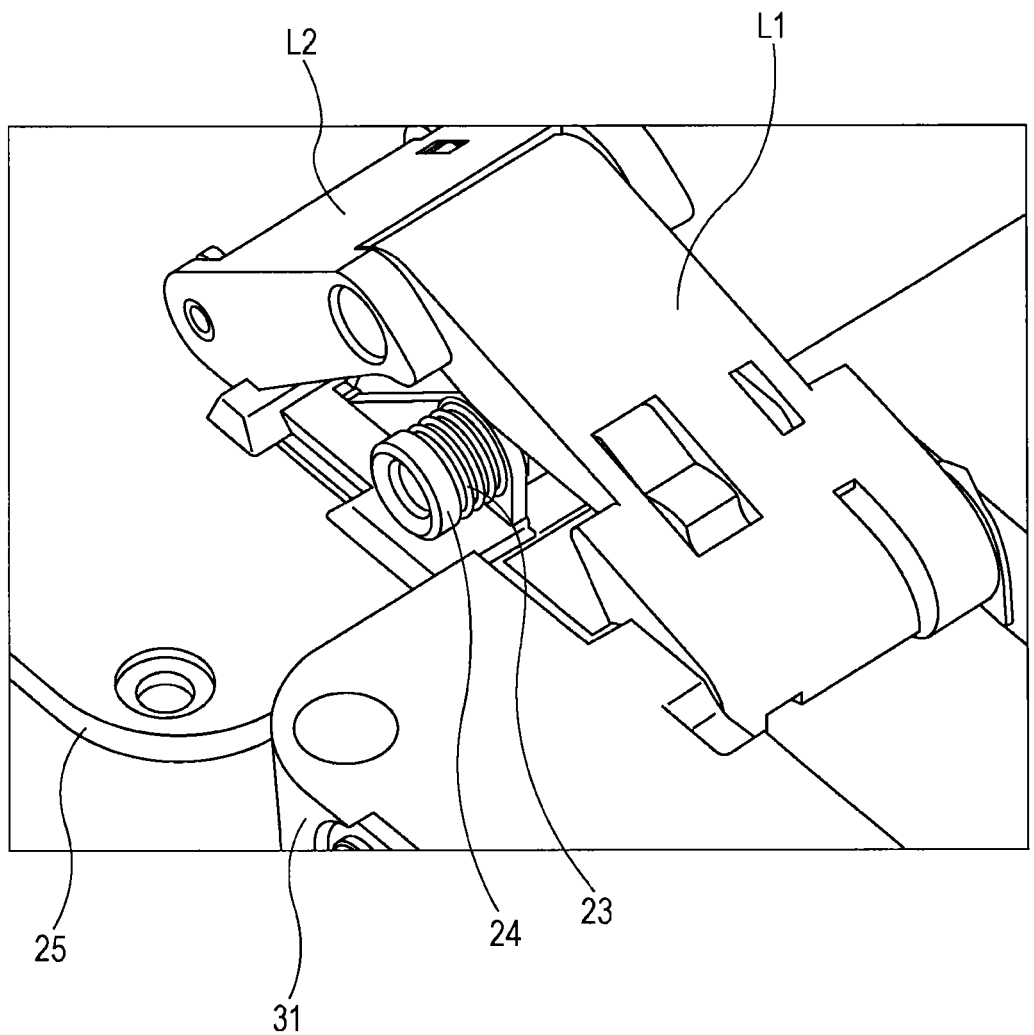
FIG. 13 is a perspective view of the hinge portion in the open state, showing the appearance of a slide member and a coil spring.

In the example shown, a slide member 24 having a donut-shaped end portion projecting outward is fitted onto a shaft 26 (including the node N6) supported by the support member 21 of the fourth arm L4a. An urging force directed outward along the shaft 26 is applied to the slide member 24 by an elastic member such as a coil spring 23. FIG. 13 is a perspective view of the hinge portion in the open state, showing the appearance of the slide member 24 and the coil spring 23.

On the other hand, a protruding portion 33 is provided on the inner wall of the hinge cover 31 fixed to the first housing 10. The protruding portion 33 has a substantially oblong or circular shape having an inclined surface at the periphery. The internal space of the donut shape of the slide member 24 has a size enough to accommodate the protruding portion 33.

Now, when the second housing 20 is closed with respect to the first housing 10 from the open state, the outer periphery of the slide member 24 abuts against the side surface of the protruding portion 33 as shown in FIG. 12A in a transient state before reaching the completely closed state. When an external force in the direction of closing the second housing 20 with respect to the first housing 10 is further exerted from this state, the slide member 24 is moved along the shaft 26 against the repulsive force of the coil spring 23 as shown in FIG. 12B. This causes the peripheral portion of the slide member 24 to ride on top of the protruding portion 33. When an external force in the same direction is further exerted, the repulsive force of the coil spring 23 urges the inner inclined surface of the donut shape of the slide member 24 to slide down the outer inclined surface of the protruding portion 33. At this time, the force applied from the protruding portion 33 to the slide member 24 includes a force component in the direction of moving the slide member 24 (and the shaft 26 and hence the second housing 20) closer to the first housing 10. The state in which the inner inclined surface of the donut shape of the slide member 24 has slid down the outer inclined surface of the protruding portion 33 corresponds to the completely closed state.

Thus, the drawing mechanism generates a drawing force for bringing the opposing end portion of the second housing 20 closer to the opposing end portion of the first housing 10 when the first housing 10 and the second housing 20 are within a predetermined range proximate to the closed state. In other words, the predetermined range is a predetermined opening angle range in which the opening angle of the portable terminal is close to the closed state.

The external force may be a manual force of the user, or may be a force of another spring (an elastic member mounted to a reverse torque generation mechanism to be discussed later) that assists opening and closing of the housings. Also in the case where a force of another spring is assistively used to close the housings, the drawing mechanism is useful to secure such drawing into the closed state.

The drawing mechanism may not only operate immediately before the portable terminal reaches the completely closed state from the open state to draw the portable terminal into the closed state, but also operate to return the portable terminal from the reverse opening state discussed above into the closed state in the case where such reverse opening is caused.

A second configuration example of the drawing mechanism and operation of the drawing mechanism will be described with reference to FIGS. 14, 15, 16A, and 16B.

Figure 14:
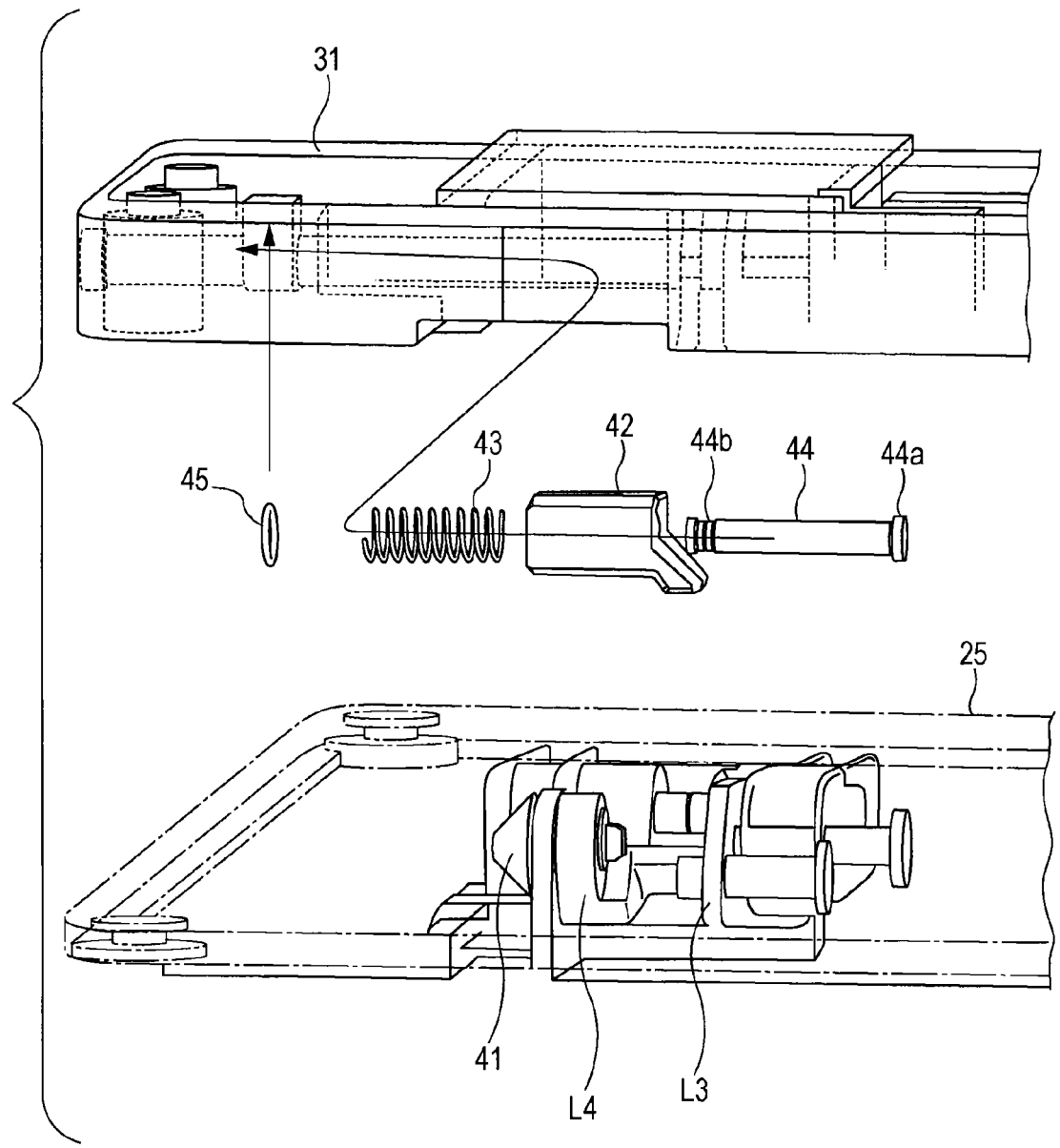
FIG. 14 is an exploded perspective view of an essential portion of the hinge portion.

FIG. 14 is an exploded perspective view of an essential portion of the hinge portion. In the second configuration example, a substantially conical end portion 41 is formed at an end portion of the shaft 26 supported by the support member 21 of the fourth arm L4. On the other hand, a slide member 42 is provided inside the hinge cover 31. The slide member 42 is supported so as to be slidable along a shaft 44, and urged in one direction by a coil spring 43.

Figure 15:
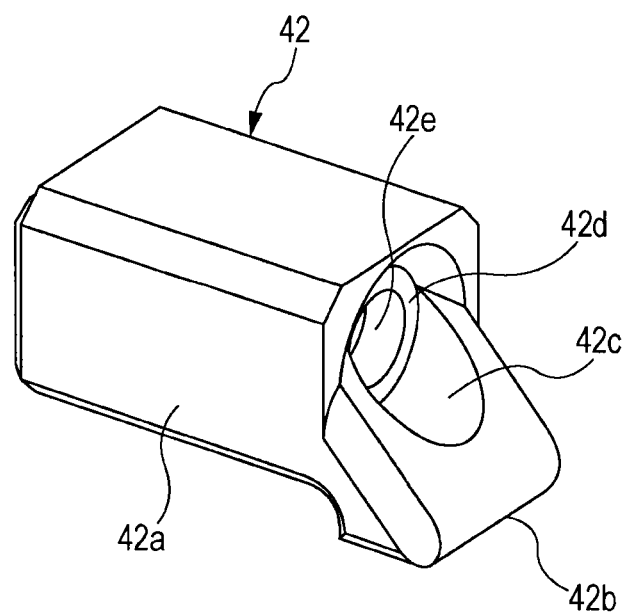
FIG. 15 is a perspective view showing the appearance of the slide member.
Figure 16A:
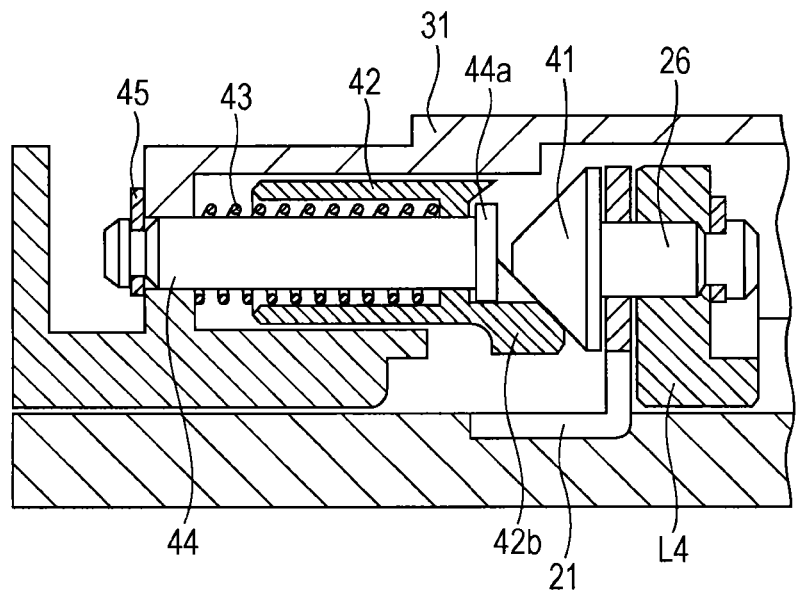
FIGS. 16A and 16B are each a cross-sectional view of an essential portion illustrating operation of a second configuration example of the drawing mechanism.
Figure 16B:
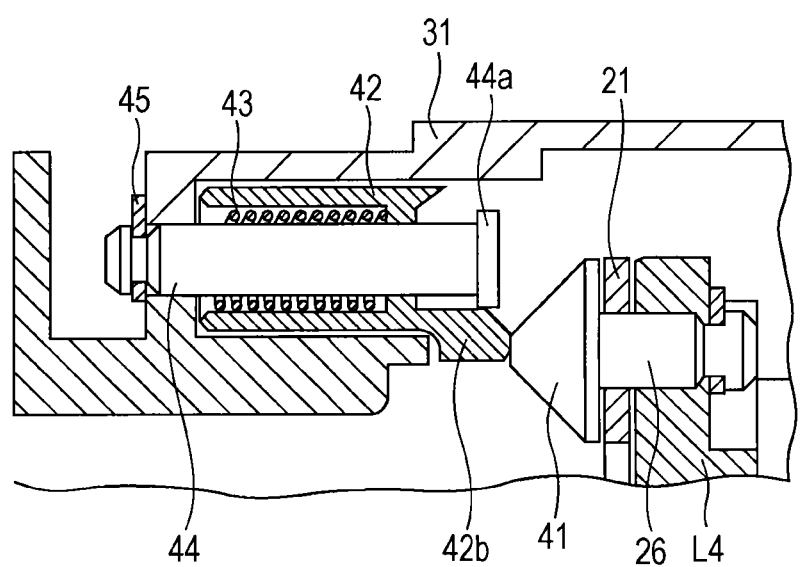

FIG. 15 is a perspective view showing the appearance of the slide member 42. FIGS. 16A and 16B are each a cross-sectional view of an essential portion of the hinge portion illustrating operation of the second configuration example of the drawing mechanism.

The shaft 44 penetrates through a through hole 42e of the slide member 42 and the coil spring 43, and further penetrates through a wall surface provided inside the hinge cover 31. Disengagement of the shaft 44 from the wall surface is prevented by a C ring (fixing member) 45 fixed in an annular groove 44b at one end of the shaft 44.

As well seen in FIG. 16A, one end of the coil spring 43 abuts against the wall surface and the other end of the coil spring 43 is inserted into a cylindrical internal cavity of the slide member 42 to urge the slide member 42 from inside the cavity in the direction away from the wall surface along the shaft 44. A shoulder portion 42d of the slide member 42 abuts against the inside of a large-diameter portion 44a at an end portion of the shaft 44 to restrict further slide of the slide member 42. A cylindrical notch 42c (FIG. 15) formed at an inclined portion of a projecting portion 42b of the slide member 42 forms a space for accommodating the large-diameter portion 44a of the shaft 44, and also forms the shoulder portion 42d.

When the portable terminal is brought closer to the closed state from the open state, the conical inclined surface of the shaft 26 abuts against the inclined surface of the projecting portion 42b of the slide member 42 at a predetermined opening angle. As the opening angle is further reduced in the closing direction, the projecting portion 42b presses the slide member 42 toward the C ring 45 against the repulsive force of the coil spring 43 along the inclined surface of the conical end portion 41. FIG. 16B shows a state in which the slide member 42 is maximally pressed. In this state, the vertex of the conical end portion 41 of the shaft 26 has ridden on the vertex of the projecting portion 42b. If the shaft 26 is further moved from this state toward the closed state to even the slightest degree, the inclined surface of the projecting portion 42b abuts against the opposite inclined surface of the conical end portion 41 so that the inclined surface of the projecting portion 42b is pressed by the repulsive force of the coil spring 43 along the longitudinal direction of the shaft 44. The force to be exerted on the inclined surface of the conical end portion 41 of the shaft 26 in this way includes a force component in the direction of moving the shaft 26 closer to the first housing 10. The state (FIG. 16A) in which the projecting portion 42b of the slide member 42 has slid down the outer inclined surface of the conical end portion 41 of the shaft 26 corresponds to the completely closed state.

Thus, the drawing mechanism generates a drawing force for bringing the opposing end portion of the second housing 20 closer to the opposing end portion of the first housing 10 when the first housing 10 and the second housing 20 are within a predetermined range proximate to the closed state.

Next, a third configuration example of the drawing mechanism and operation of the drawing mechanism will be described with reference to FIGS. 17A and 17B.

In the configuration example, a substantially swelled portion 51a is formed at an end portion of a shaft 51 supported by the support member 21 of the fourth arm L4. In addition, a swelled portion 52 having substantially the same shape as the swelled portion 51a is fixed to a shaft portion of the shaft 51. On the other hand, an elastic member 53 is disposed inside the hinge cover 31 to selectively receive the swelled portions 51a and 52. The elastic member 53 has a substantially angular U-shaped cross section, and the free ends of the elastic member 53 each have a portion bent in a "<" cross-sectional shape.

Figure 17A:
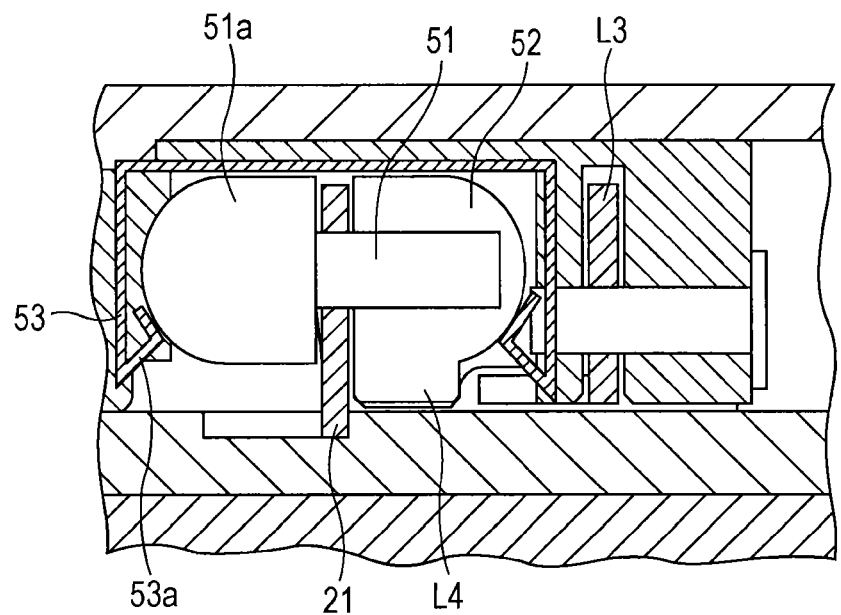
FIGS. 17A and 17B illustrate a third configuration example of the drawing mechanism and operation of the drawing mechanism.
Figure 17B:
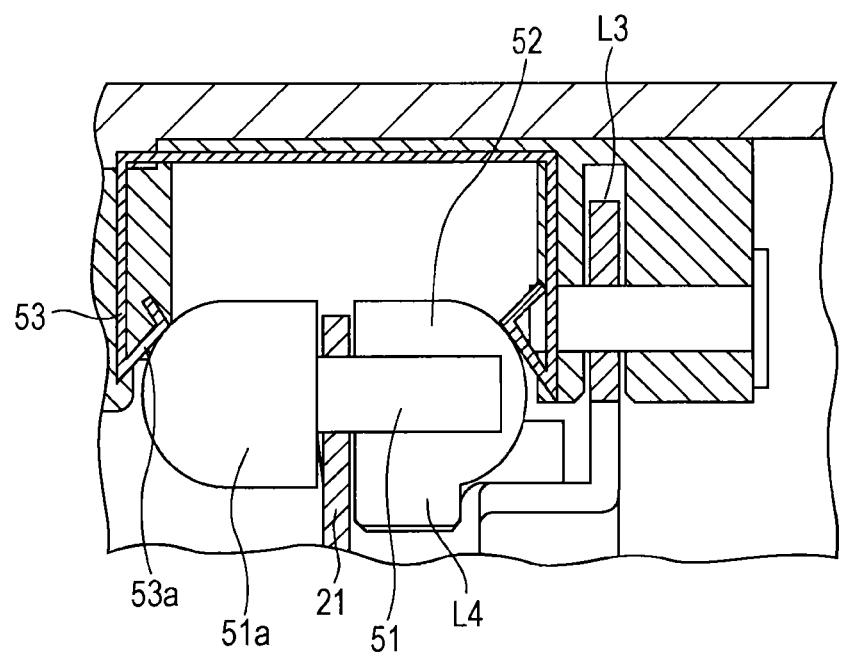

As shown in FIG. 17B, when the portable terminal is brought closer to the closed state from the open state, the two swelled portions 51*a* and 52 of the shaft 51 abut against the side surfaces of the projecting portions, which have a "<" cross-sectional shape, of the elastic member 53 at a predetermined opening angle. As the opening angle is further reduced, the opening angle of the two arms of the angular U-shaped elastic member becomes larger with the two swelled portions resisting against the repulsive force of the elastic member 53 as the swelled portions move along the inclined surfaces of the projecting portions having a "<" cross-sectional shape.

If the shaft 51 is moved from this state toward the closed state to even the slightest degree after the two swelled portions reach the projecting portions having a "<" cross-sectional shape, the restoring force of the elastic member 53 causes the inclined surfaces of the swelled portions 51*a* and 52 to slide down the opposite inclined surfaces of the projecting portions, which have a "<" cross-sectional shape, of the elastic member 53 so that the shaft 51 is drawn into the completely closed state by the elastic member 53 which has an angular U-shaped cross section as shown in FIG. 17A.

Figure 18A:
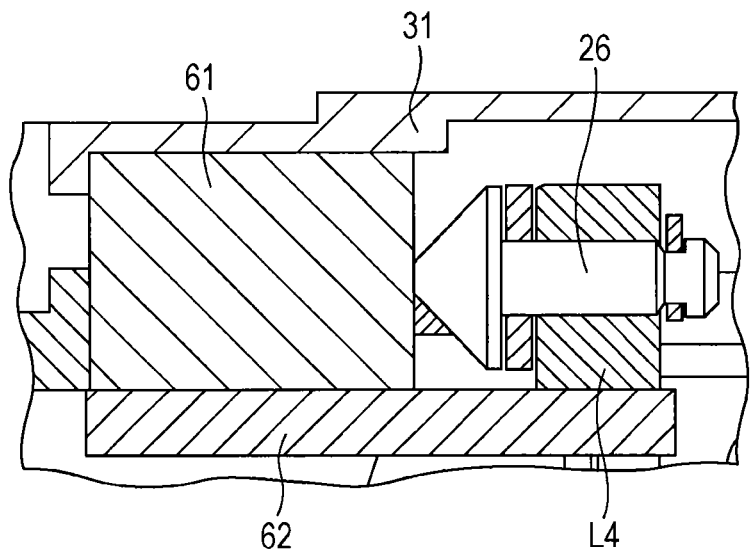
FIGS. 18A and 18B illustrate a fourth configuration example of the drawing mechanism and operation of the drawing mechanism.
Figure 18B:
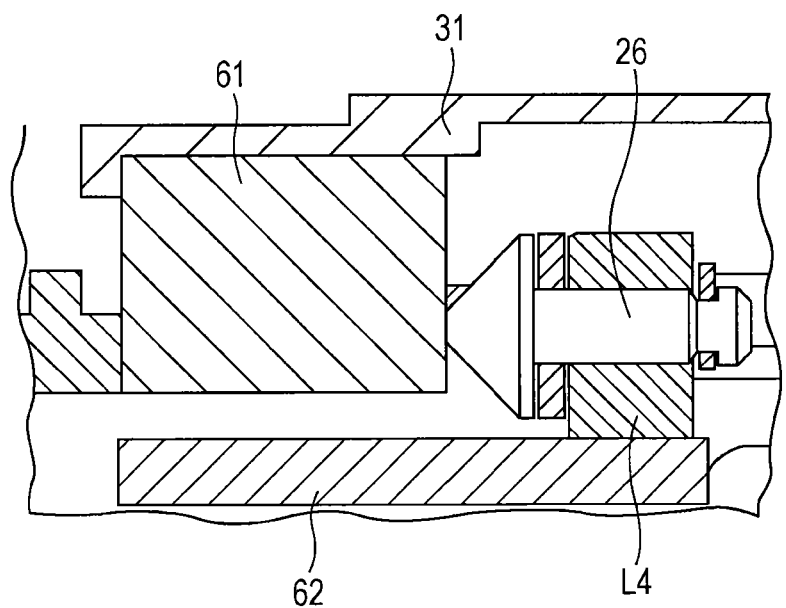

Next, a fourth configuration example of the drawing mechanism and operation of the drawing mechanism will be described with reference to FIGS. 18A and 18B. In the fourth configuration example, a permanent magnet 61 is disposed in the hinge cover 31 on the first housing 10 side, and a metal plate 62 is disposed on the second housing 20 side. The relationship in arrangement position between the permanent magnet 61 and the metal plate 62 may be such that the permanent magnet 61 attracts the metal plate 62 when the first housing 10 and the second housing 20 are within a predetermined range proximate to the closed state. In other words, the drawing mechanism generates a drawing force that brings the opposing end portion of the second housing 20 closer to the opposing end portion of the first housing 10 when the opening angle of the portable terminal is within a predetermined range close to the closed state. The relationship between the permanent magnet 61 and the metal plate 62 may be reversed.

Fourth Embodiment

Downsizing of portable terminals such as cellular phones and smartphones is often sought after. To this end, efficient layout design/space saving of internal components is sought after. Of course, a movable mechanism (such as a hinge) that has a spring or a cam and that involves a large amount of force and a large number of design requirements is not an exception. While the design requirements should be met, efficient layout of other internal components should not be inhibited. Other associated mechanical components are often juxtaposed around the movable mechanism. In the current state of the art, such components are often structurally separate from each other although they are functionally associated with each other, and a number of spaces are often required, the number of the spaces corresponding to the number of functions required.

For example, many of the components include a coil spring, and juxtaposition of such individual coil springs may be disadvantageous in terms of space saving and layout flexibility.

Thus, in the fourth embodiment, a plurality of coil springs are nested to provide a space-saving structure.

In the third embodiment discussed above, the coil spring 43 is utilized. A hinge portion that couples a first housing and a second housing and that utilizes another coil spring, besides the coil spring 43, as an elastic member that generates a force for assisting opening and closing operation performed by a user is known. The coil spring is an elastic member mounted to a so-called reverse torque generation mechanism. The reverse torque generation mechanism is a mechanism provided at a hinge portion that couples a first housing and a second housing, that generates a closing force for maintaining the closed state when the portable terminal is in the closed state (or a state close to the closed state), and that conversely generates an opening force for urging the portable terminal toward the open state when an intermediate opening angle (for example, 90°) is exceeded as the two housings are opened by a user's operation against the closing force.

If a coil spring used in such a reverse torque generation mechanism is used in combination with the coil spring of the drawing mechanism described above, the layout of components in the housings of the portable terminal may be restrained (the layout flexibility may be restricted). In other words, it may be difficult to secure a separate space for the associated mechanical components.

Thus, in the embodiment, a first elastic member and a second elastic member have different diameters, and one of the elastic members is internally contained in a space occupied by the other elastic member. More specifically, one of the coil springs is disposed in the internal space of the other coil spring to achieve space saving.

Figure 19:
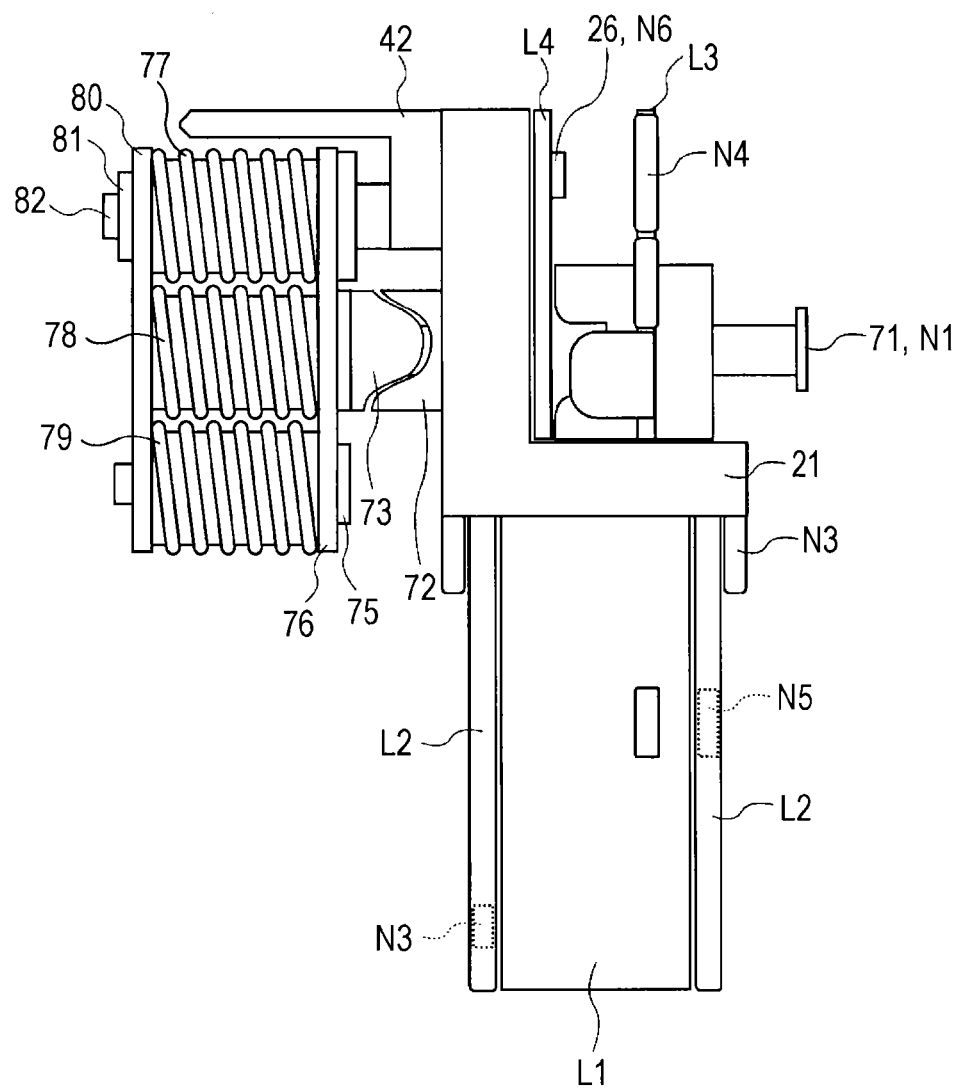
FIG. 19 shows a configuration example of a hinge portion according to an embodiment of the present invention.

FIG. 19 shows a configuration example of a hinge portion according to the embodiment. The drawing is a plan view of the hinge portion in the closed state. In addition to the configuration of the hinge portion discussed above, a reverse torque generation mechanism is added to a shaft 71 of the node N1. The reverse torque generation mechanism includes a cam piece 72, a cam piece 73, and three coil springs 77, 78, and 79. The cam piece 72 is coupled to the first arm L1, and penetrated by the shaft 71. The cam piece 73 is penetrated by the shaft 71, and engaged with the cam piece 72 so as to be rotatable by at least 180° with first and second stable states. The three coil springs 77, 78, and 79 each apply an urging force that urges the cam piece 73 against the cam piece 72. The three coil springs have the same shape and size, and are interposed between a plate 76 and a plate 80 to be disposed in parallel with each other. C rings 82, 83, and 84 are mounted to an annular groove at an end portion of the shafts 44, 71, and 75, respectively, to prevent each shaft from slipping off. The sum of the forces of the three coil springs is applied to the cam piece 73. The spring force required from the coil springs used in the reverse torque generation mechanism is larger than the spring force of the coil spring used in the drawing mechanism discussed above. Because three coil springs are used to implement the function of a single coil spring, the size (in particular, length) of each coil spring can be reduced.

The embodiment improves the degree of freedom in component layout, and allows space saving.

While three coil springs are used in the reverse torque generation mechanism, the number of coil springs is not limited to three.

Figure 20:
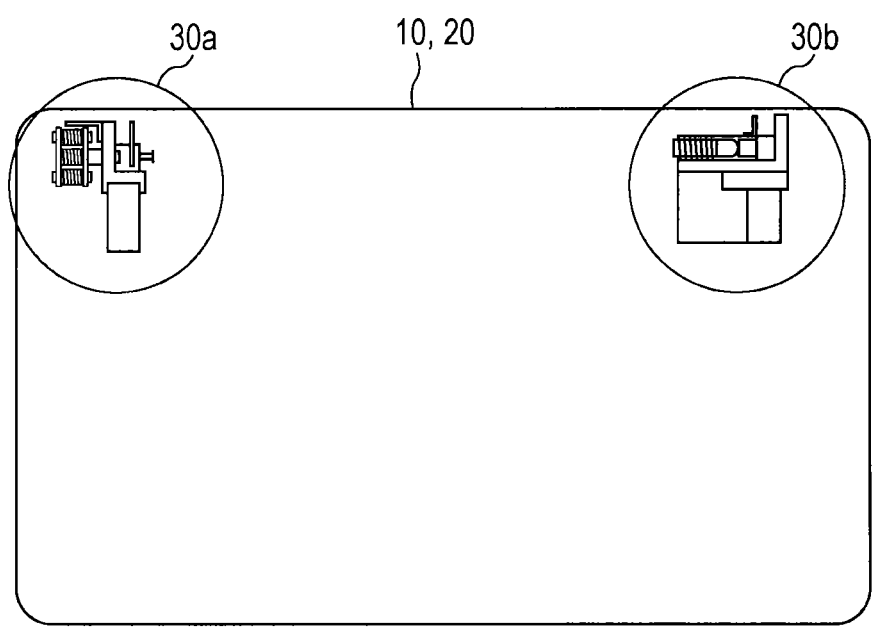
FIG. 20 shows a configuration in which a link mechanism forming a hinge portion is disposed at two locations at both ends of a portable terminal.

Although a link mechanism forming a hinge portion is disposed at two locations at both ends of a portable terminal as shown in FIG. 20, it is not necessary that the hinge portions 30*a* and 30*b* should necessarily have completely the same shape or function as each other. In the embodiment, as shown in FIG. 20, the hinge portion 30*a* adopts coil springs having a double structure.

Figure 21:
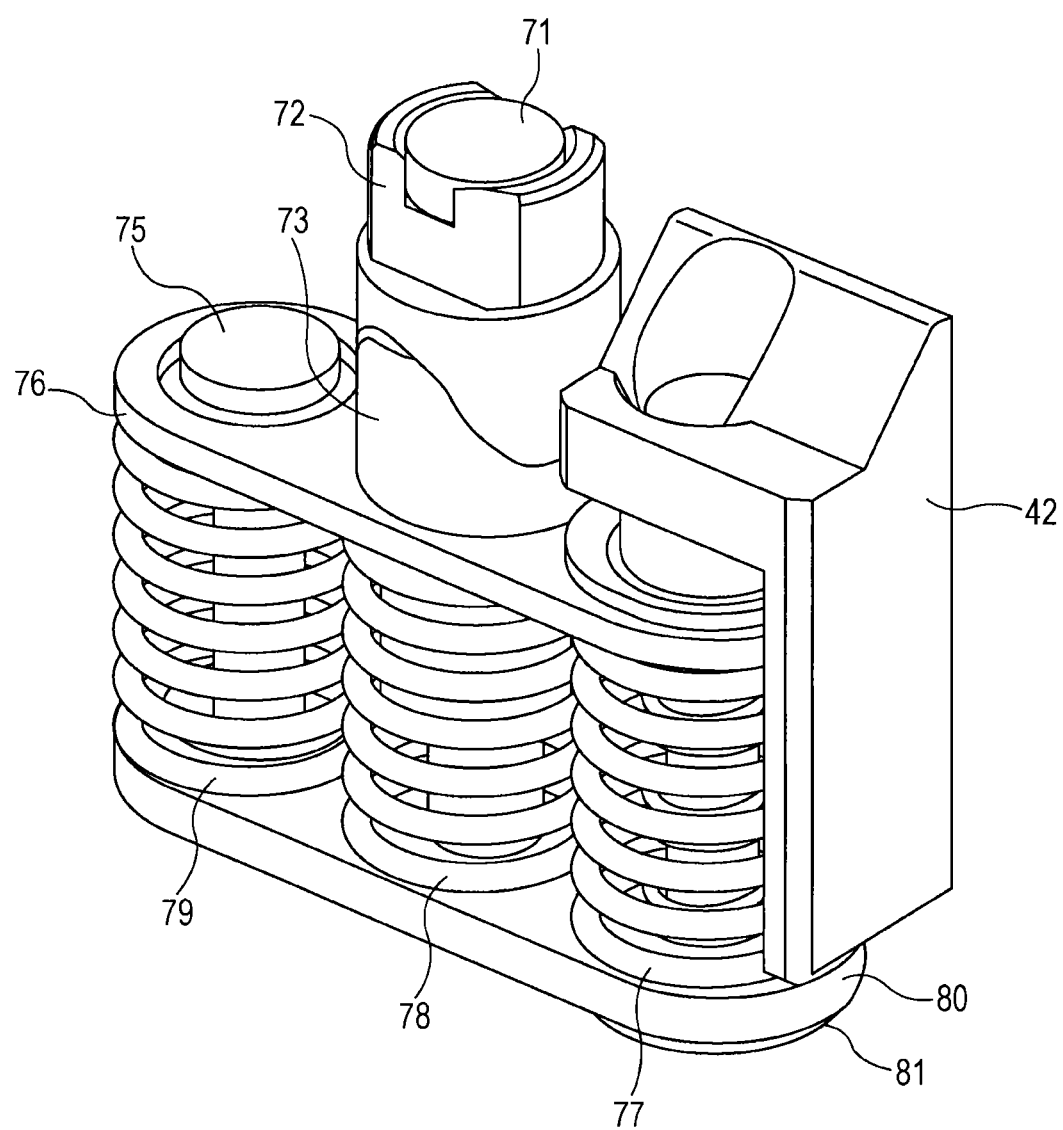
FIG. 21 is a perspective view showing the appearance around a reverse torque generation mechanism of the hinge portion.
Figure 22:
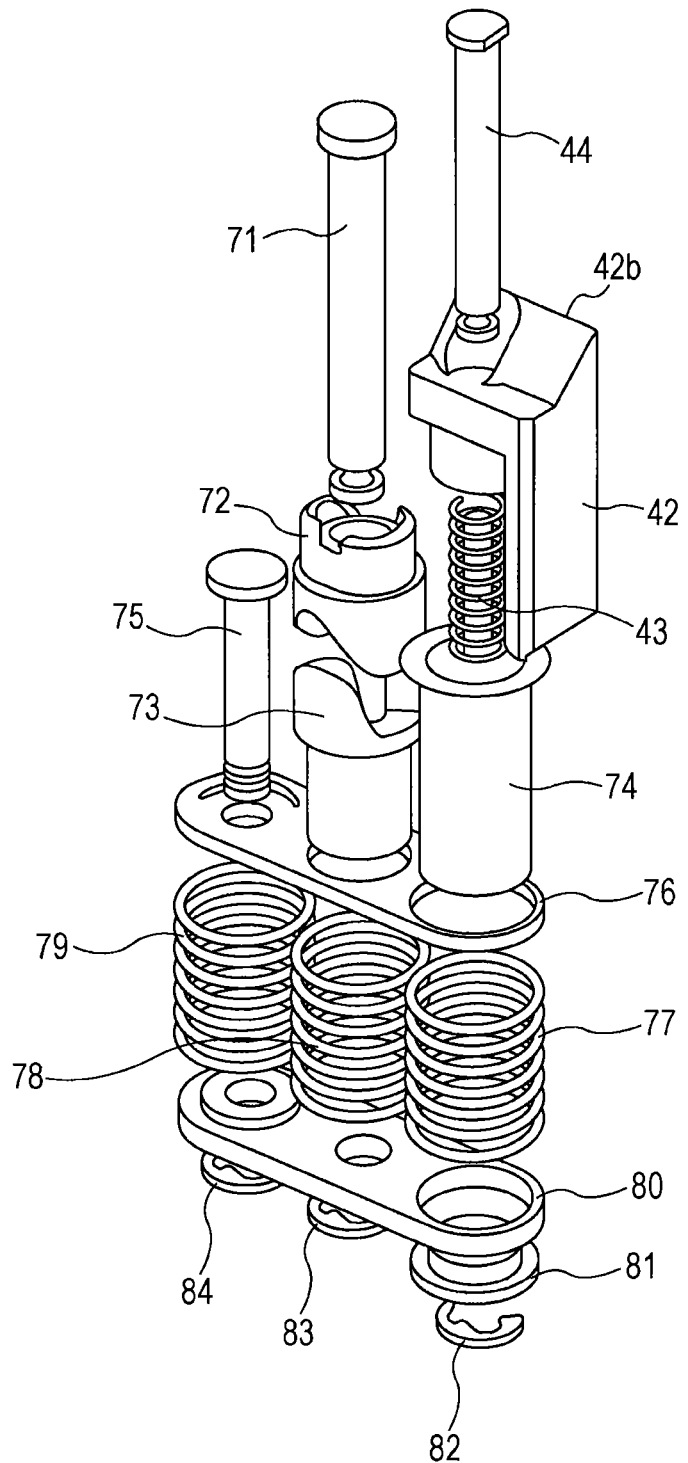
FIG. 22 is an exploded perspective view of the reverse torque generation mechanism shown in FIG. 21.
Figure 23:
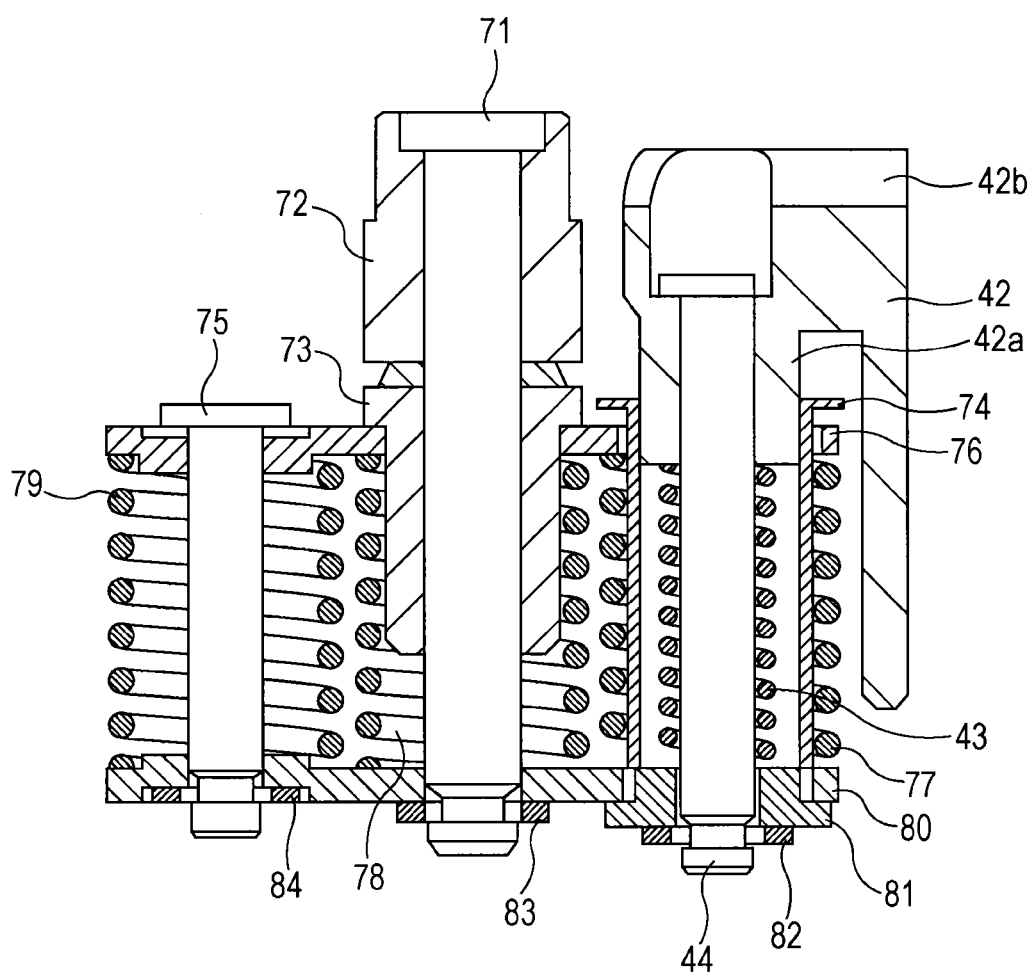
FIG. 23 is a cross-sectional view taken along a plane including vertical cross sections of three shafts 44, 71, and 75 of FIG. 21.

FIG. 21 is a perspective view showing the appearance around a reverse torque generation mechanism of the hinge portion 30*a*. FIG. 22 is an exploded perspective view of the reverse torque generation mechanism. FIG. 23 is a cross-sectional view taken along a plane including vertical cross sections of three shafts 44, 71, and 75 of FIG. 21.

As well seen from FIG. 23, the coil spring 77 on the outer side and the coil spring 43 on the inner side are functionally independent of each other. That is, the coil spring 77 on the outer side provides a spring force for the reverse torque generation mechanism in cooperation with the other coil springs 78 and 79. The coil spring 43 on the inner side is an elastic member mounted to the drawing mechanism discussed above.

A sleeve 74 functions as a partition wall that separates between the coil spring 77 on the outer side and the coil spring 43 on the inner side, and the inner wall functions to slidably support a cylindrical portion 42*a* of the slide member 42. One end of the slide member 42 is urged in the direction opposite to a lid portion 81 along the longitudinal direction of the shaft 44 by the repulsive force of the coil spring 43 which abuts against the inner wall of the lid portion 81. The coil spring 77 on the outer side and the coil spring 43 on the inner side are operationally independent of each other so that one does not affect the other.

Fifth Embodiment

Next, a fifth embodiment of the present invention will be described.

In a portable terminal of a type in which a first housing and a second housing are coupled by a hinge portion, in general, a flexible cable that uses a flexible printed circuit board (FPC) is used as a transfer path that electrically connects between the two housings.

The common method of routing the flexible cable between the first housing and the second housing according to the related art is so-called "a winding" in case of a single-axis hinge, and so-called "U-shaped twisting" in case of a one-direction slider hinge. The two design techniques commonly aim at the following two points:

A to efficiently absorb an extra length of the flexible cable provided for opening and closing; and B to prevent wire wear and a wire break due to sliding between the flexible cable and other components.

However, it was found that the a winding and the U-shaped twisting were not effective for a movable mechanism having a plurality of degrees of freedom or a plurality of articulations such as the hinge portion discussed above. That is, in the case where a flexible cable is used to connect between the first housing and the second housing across a mechanical component having a plurality of articulations, the locus of the flexible cable may be different each time the housings are opened and closed because of too high a degree of freedom of motion of the flexible cable. The too high degree of freedom of motion of the flexible cable may also result in interference and wear between the flexible cable and other components. This may cause a wire break.

Thus, the embodiment proposes a method of connecting a flexible cable for a portable terminal that adopts a movable mechanism having a plurality of degrees of freedom or a plurality of articulations as a hinge portion. An extra length of the flexible cable provided for opening and closing is efficiently absorbed, and wear and a break of the flexible cable due to sliding between the flexible cable and other components are prevented. In the embodiment, the term "hinge portion" includes not only those for which opening and closing operation of first and second housings includes rotational motion about an axis but also those for which opening and closing operation of the two housings includes sliding motion with respect to each other.

Figure 24A:
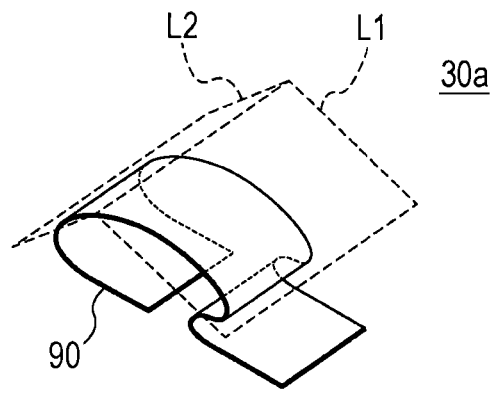
FIGS. 24A and 24B are each a perspective view of a portable terminal that adopts a hinge portion that utilizes a link mechanism including four links in the open state as seen from a back surface.
Figure 24B:
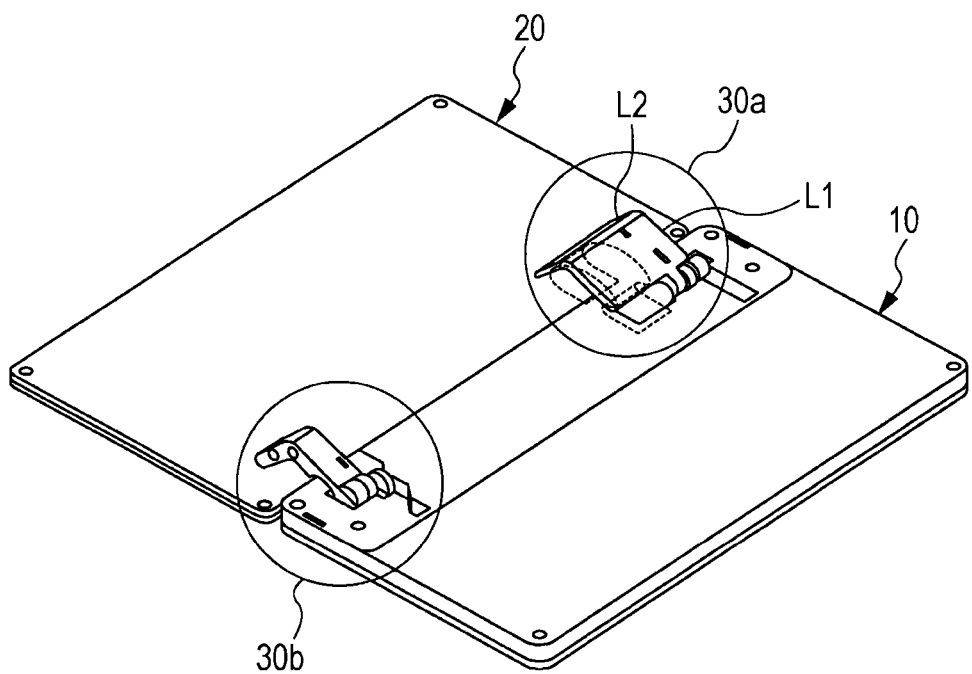

FIG. 24B is a perspective view of a portable terminal that adopts the hinge portion that utilizes a link mechanism including four links discussed above in the open state as seen from a back surface, and FIG. 24A is a schematic enlarged view of an essential portion of the hinge portion. The portable terminal includes a first hinge portion 30*a* and a second hinge portion 30*b* as the hinge portion 30 configured as discussed above as the hinge portion that connects between the first housing 10 and the second housing 20. The first hinge portion 30*a* and the second hinge portion 30*b* may be different in width as shown in the drawing. In the illustrated example, as shown in FIG. 24A, the first hinge portion 30*a* has a larger width (in the direction of the rotational axis of the hinge) to accommodate a flexible cable 90 inside. The flexible cable 90 is provided to electrically connect between the first housing 10 and the second housing 20.

Figure 25B:
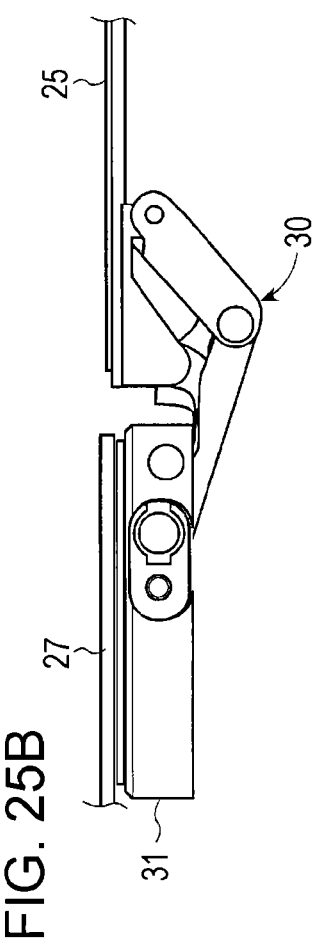
FIGS. 25A to 25D show the state of arrangement (routing) of a flexible cable in a fifth embodiment of the present invention.
Figure 25D:
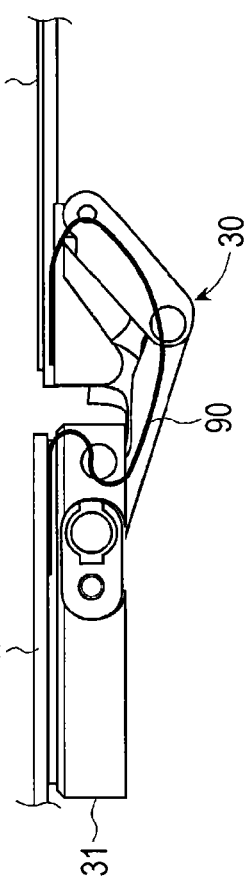
Figure 25A:
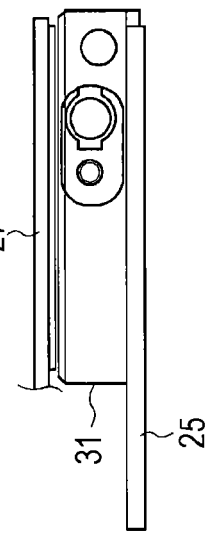
Figure 25C:
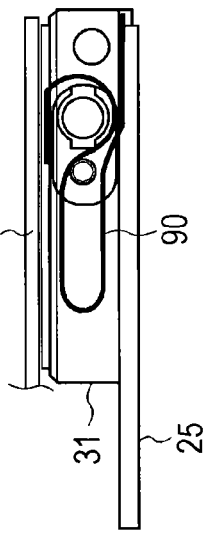

FIGS. 25A and 25B show the hinge portion which uses a link mechanism including four links discussed above in the closed state and the open state, respectively. FIGS. 25C and 25D show the state of arrangement (routing) of the flexible cable 90 with the hinge portion in the closed state and the open state, respectively.

One end of the flexible cable 90 is fixedly connected to a circuit substrate 27 in the first housing 10, and the other end of the flexible cable 90 is fixedly connected to a circuit substrate 25 in the second housing 20. It is necessary that the flexible cable 90 should have a length enough to ensure that the portable terminal opens and closes over the entire range of opening angles of 0° to 180°. On the other hand, a length of the flexible cable 90 more than necessary is not only uneconomical but also obstructs opening and closing of the portable terminal, and there should not be an extra length of the flexible cable 90 in order to prevent wear due to contact with other components. From such viewpoints, a necessary minimum length of the flexible cable 90 is selected. Even if such an adequate length is selected, there may be slack in the flexible cable 90 depending on the opening angle, which may cause wear due to contact with other components along with opening and closing operation of the portable terminal.

The arrangement and the structure of the flexible cable in the portable terminal shown in FIG. 24B will be described with reference to FIGS. 26A, 26B, and 27. FIGS. 26A and 26B are each a schematic side view of an essential portion of a portable terminal at an opening angle of 0° and 180°, respectively. FIG. 27 is a schematic side view of the essential portion at an opening angle of 90°. In the drawings, of the four arms, only the arms L1 and L2 are shown and the arms L3 and L4 are not shown for convenience.

In the embodiment, an intermediate point between both ends of the flexible cable 90 is fixed at a predetermined location P on a particular movable component (in the illustrated example, the arm L1) of the hinge portion. In the drawings, the positions at which the flexible cable 90 is fixed are indicated by "Fix" blocks. The position of the intermediate point at which the flexible cable 90 is fixed and the position of an object to which the flexible cable 90 is fixed are determined so as not to obstruct opening and closing operation of the portable terminal over the entire range of opening angles of 0° to 180°. The number of such intermediate points for fixation is not necessarily limited to one unless opening and closing operation of the portable terminal is obstructed.

By fixing the flexible cable to a movable component at an intermediate point, the range of motion of the flexible cable can be divided into sub-ranges to simply the behavior of the flexible cable. That is, motion of each sub-range of the flexible cable can be limited to such motion that has occurred in the past. As a result, repeatability of motion of the flexible cable can be secured. At the same time, wear and slide between the flexible cable and other components can be prevented while securing a space for absorbing an extra length of the flexible cable.

Figure 28A:
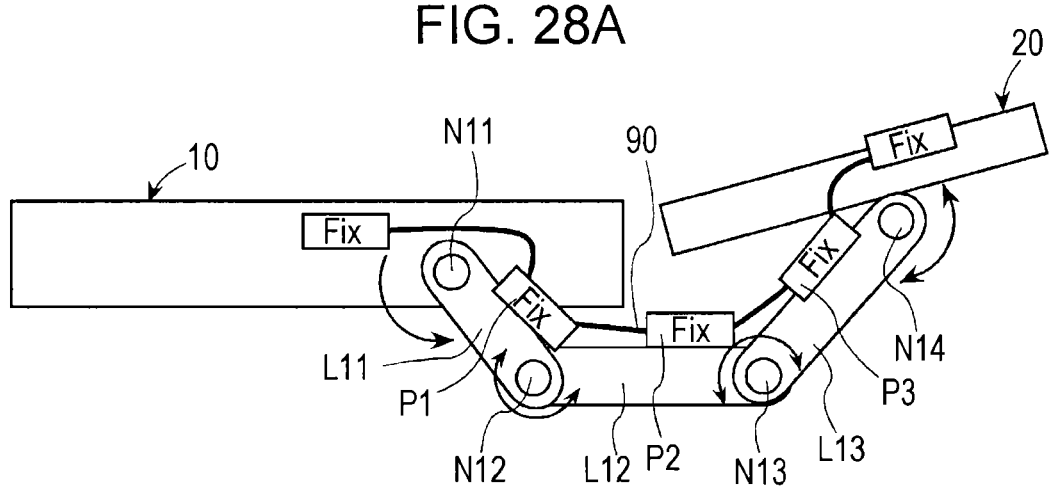
FIGS. 28A and 28B shows a modification example of the fifth embodiment of the present invention.

The mechanical component having a plurality of articulations is not limited in number of articulations and type of operation. FIG. 28A shows such a modification example. In the example of the link mechanism described above, the number of a set of arms (links) connected in series between the first housing 10 and the second housing 20 is two. In the modification example of FIG. 28A, the number of such arms connected in series is three. One end of a first arm L11 is rotatably supported by the first housing at a node N11. The other end of the arm L11 is rotatably coupled to one end of an arm L12 at a second node N12. The other end of the arm L12 is rotatably coupled to one end of an arm L13 at a third node N13. The other end of the arm L13 is rotatably supported by the second housing 20 at a node N14. The support may be performed via the support member 21 discussed above. In the example, in the same manner as described above, one end and the other end of the flexible cable 90 are fixedly connected to the first housing and the second housing, respectively. A first intermediate point of the flexible cable 90 is fixed to a predetermined location P1 of the first arm L11. A second intermediate point of the flexible cable 90 is fixed to a predetermined location P2 of the second arm L12. A third intermediate point of the flexible cable 90 is fixed to a predetermined location P3 of the third arm L13.

Figure 28B:
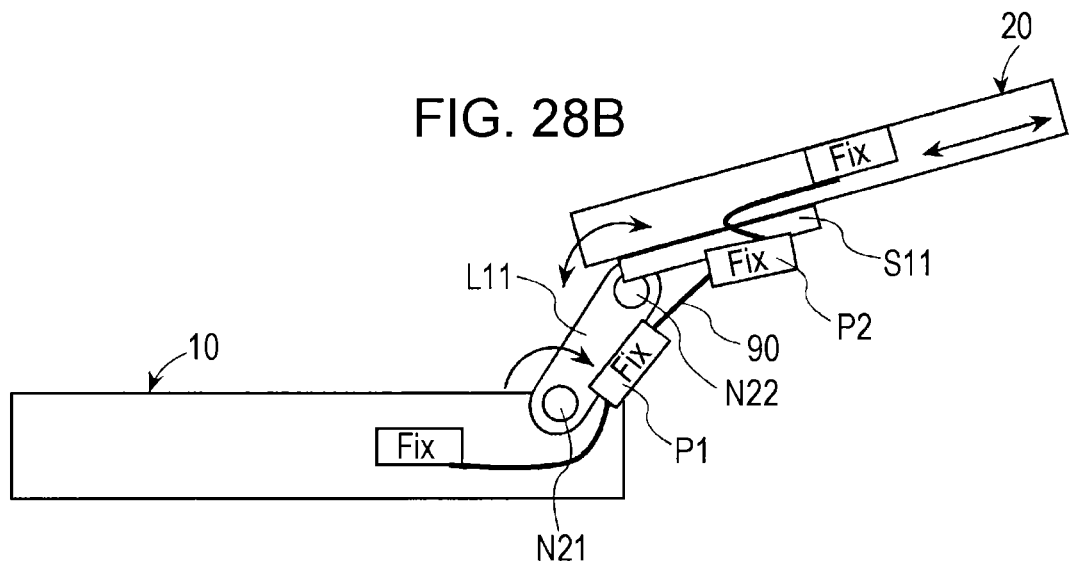

FIG. 28B shows another modification example. The modification example uses a first arm L11 and a slide hinge S11 as a movable mechanism. The slide hinge S11 is a member that supports the second housing 20 so as to be linearly slidable with respect to the node N22 within a predetermined movable range. One end of the arm L11 is rotatably supported by the first housing 10, and the other end of the arm L11 is rotatably coupled to one end of the slide hinge S11. The slide hinge S11 is fixedly supported by the back surface of the second housing 20. In the modification example, in the same manner as described above, one end and the other end of the flexible cable 90 are fixedly connected to the first housing and the second housing, respectively. A first intermediate point of the flexible cable 90 is fixed to a predetermined location P1 of the first arm L11, but a second intermediate point of the flexible cable 90 is fixed to a predetermined location P2 of the slide hinge S11.

Figure 29:
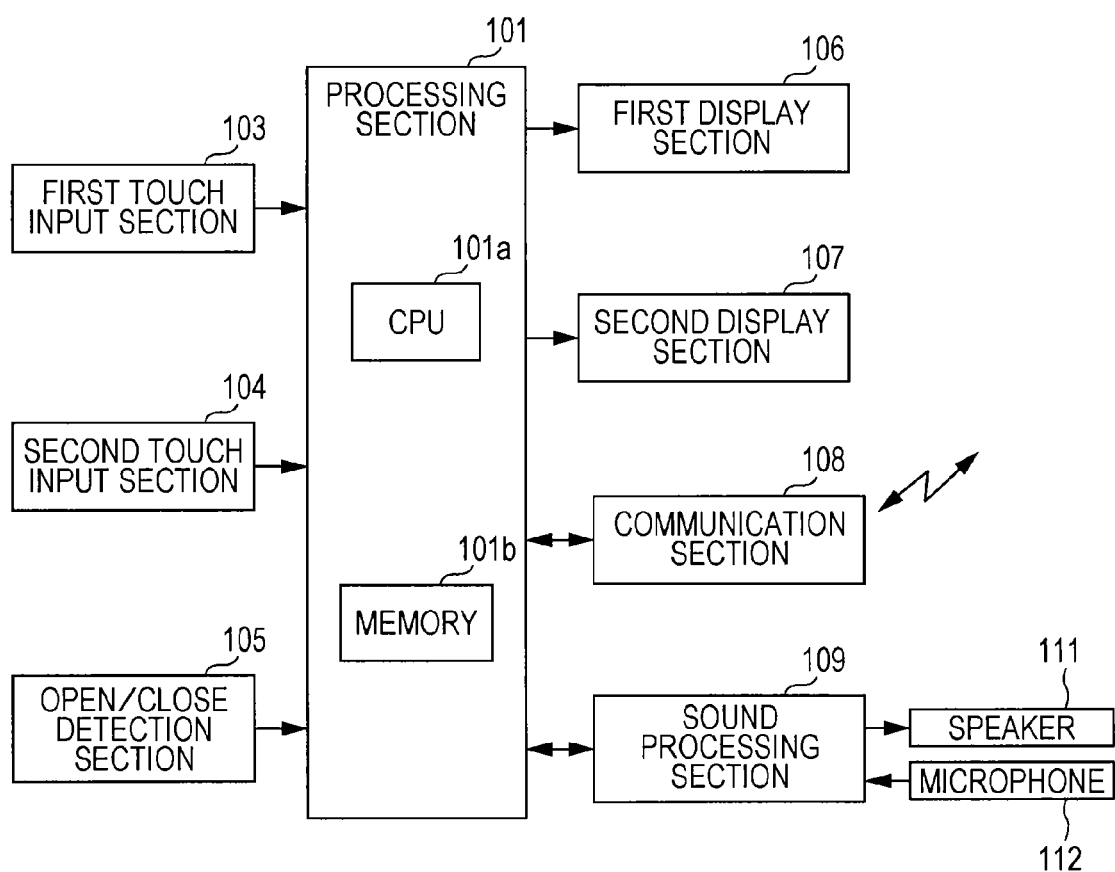
FIG. 29 is a block diagram showing a configuration example of control hardware of the portable terminal according to any of the embodiments discussed above.

FIG. 29 is a block diagram showing a configuration example of control hardware of the portable terminal according to any of the embodiments discussed above.

The portable terminal includes a processing section 101, a first touch input section 103, a second touch input section 104, an open/close detection section 105, a first display section 106, a second display section 107, a communication section 108, a sound processing section 109, a speaker 111, a microphone 112, and so forth.

The processing section 101 is a section that performs various control and processes of the portable terminal, and includes a CPU 101a, a memory 101b, and so forth. The processing section 101 also functions as a control section that performs peculiar control related to a display function and a touch detection function in the embodiment.

The first touch input section 103 is a section that provides a touch input region provided over the display region of the display portion 12. The second touch input section 104 is a section that provides a touch input region provided over the display region of the display portion 22. For both the first touch input section 103 and the second touch input section 104, the touch detection method is not specifically limited.

The open/close detection section 105 is a section that detects at least one of the open state and the closed state of the portable terminal. The detection method is not specifically limited. For example, a detection section of any type such as a magnetism sensor, an optical sensor, and a mechanical sensor may be utilized.

The first display section 106 is formed by a display device serving as the display portion 12 mounted to the first housing 10. The second display section 107 is formed by a display device serving as the display portion 22 mounted to the second housing 20. The type of the display devices is not specifically limited. For example, thin display devices such as liquid display devices and organic EL display devices may be utilized.

The communication section 108 is a section that performs wireless communication for calls and data communication for the portable terminal (cellular phone terminal). Besides, the communication section 108 may include a key operation section including hardware keys to receive an operation input from a user. The communication section 108 may further include a short-range wireless communication section for wireless LAN, Bluetooth (registered trademark), or the like.

The sound processing section 109 includes a device such as an audio codec that encodes and decodes an audio signal, and is connected to the speaker 111 that outputs sound and the microphone 112 that receives input sound.

Figure 30:
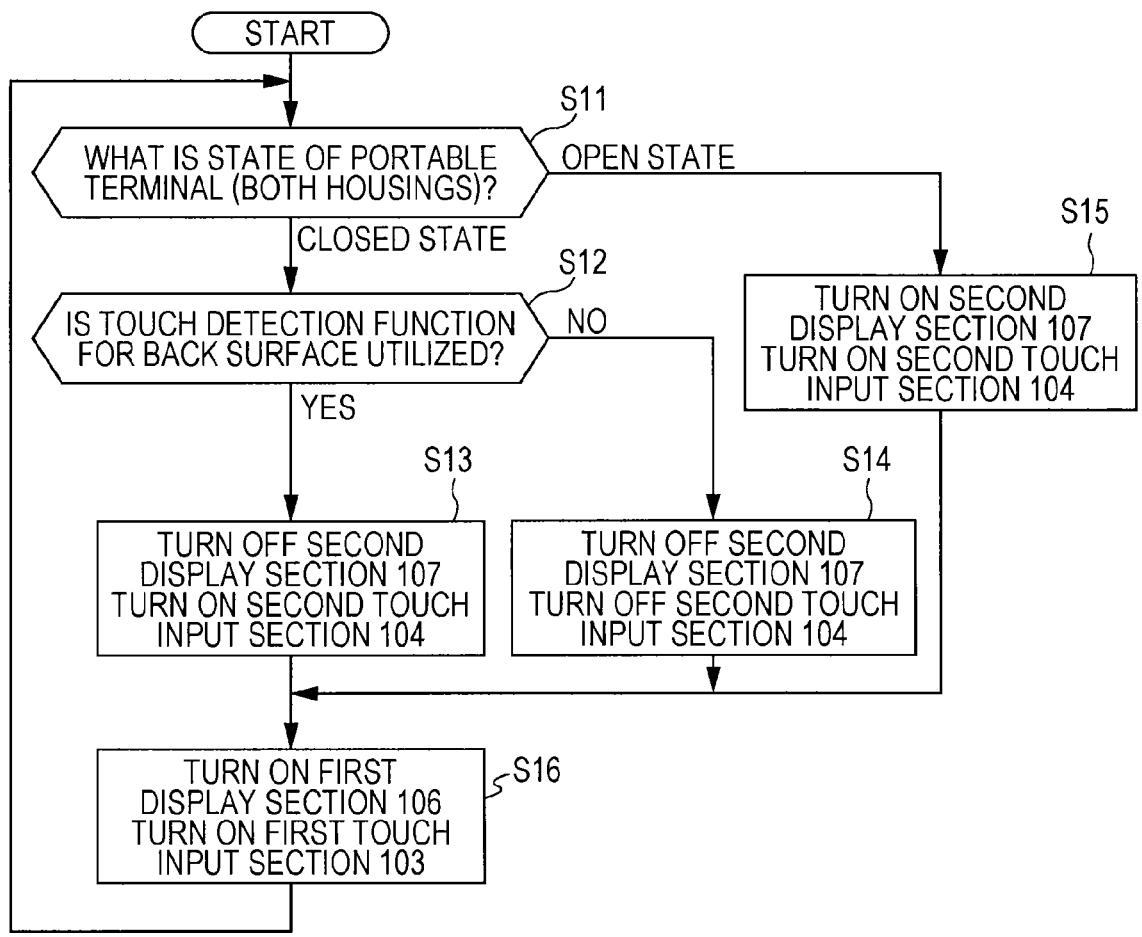
FIG. 30 is a flowchart showing a process example of a processing section that can be adopted by the portable terminal according to each embodiment.

FIG. 30 shows a process example of the processing section 101 that can be adopted by the portable terminal according to each of the embodiments described above. The process is implemented by the CPU 101a executing a program stored in the memory 101b. It should be noted, however, that such a process is not essential to the present invention.

The process is activated by turning on the portable terminal. First, the current state of the portable terminal, that is, whether the portable terminal is in the open state or the closed state, is checked on the basis of output of the open/close detection section 105 (S11). If the portable terminal is in the closed state, it is checked whether or not the touch detection function for the back surface, that is, the second touch input section 104, is utilized (S12). This check may be performed on the basis of the initial settings, the application being executed, the current operation mode, and so forth, for example.

In the case where the touch function for the back surface is utilized, the second display section 107 is disabled (turned OFF) and the second touch input section 104 is activated (turned ON) (S13). Then, the first display section 106 is turned ON and the first touch input section 103 is turned ON (S16). After that, the process returns to the initial step S11.

If it is determined in step S12 that the touch detection function for the back surface is not utilized, the second display section 107 is turned OFF and the second touch input section 104 is turned OFF (S14). After that, the process proceeds to step S16.

If it is determined in step S11 that the portable terminal is in the open state, the second display section 107 is turned ON and the second touch input section 104 is turned ON (S15). After that, the process proceeds to step S16.

By disabling the display section and the touch input section which are unused, unnecessary processing load and power consumption can be reduced.

While preferred embodiments of the present invention have been described above, various changes and modifications other than those mentioned above may be made. That is, it should be understood as a matter of course by those skilled in the art that various modifications, combinations, and other embodiments may occur depending on design requirements and other factors insofar as they are within the scope of the appended claims or the equivalents thereof.

The invention claimed is:

1. A portable terminal including:
a first housing including a first display;
a second housing including a second display; and
a hinge portion that couples the first housing and the second housing so as to be openable and closable with respective opposing end portions of the first housing and the second housing adjacent to each other and with respective surfaces of the first housing and the second housing positioned in the same plane as each other in an open state, wherein
the hinge portion is disposed so as to not be visible from a front side of the first display and the second display when the first housing and the second housing are in the open state, wherein
the hinge portion includes a drawing mechanism that generates a drawing force for bringing the opposing end portion of the second housing closer to the opposing end portion of the first housing when the first housing and the second housing are within a predetermined range proximate to a closed state.

2. The portable terminal of claim 1, wherein
the hinge portion includes a first arm member, one end of which is rotatably supported at a first location of the first housing in the vicinity of the opposing end portion.

3. The portable terminal of claim 2, wherein
the hinge portion includes a second arm member, one end of which is rotatably supported at a first location of the second housing in the vicinity of the opposing end portion and the other end of which is rotatably coupled to the other end of the first arm member.

4. The portable terminal of claim 3, wherein
the hinge portion includes a third arm member, one end of which is rotatably supported at a second location of the first housing closer to the opposing end portion than the first location and the other end of which is rotatably supported at an intermediate location of the second arm member.

5. The portable terminal of claim 4, wherein
the hinge portion includes a fourth arm member, one end of which is rotatably supported at a second location of the second housing closer to the opposing end portion than the first location and the other end of which is rotatably supported at an intermediate location of the first arm member.

6. The portable terminal of claim 5, wherein
the hinge portion includes a reverse opening prevention mechanism that restricts the amount of opening by which the opposing end portions are opened away from each other with respective free end portions of the first housing and the second housing opposite to the opposing end portions kept closed in a closed state.

7. The portable terminal of claim 6, wherein
the reverse opening prevention mechanism includes a first projecting portion that projects in a lateral direction from an intermediate portion of the third arm member and a second projecting portion that projects in a lateral direction from an intermediate portion of the fourth arm member, and when the respective opposing end portions of the first housing and the second housing are urged to be opened away from each other with the free end portions of the two housings kept closed in the closed state, the first projecting portion and the second projecting portion abut against each other to hinder such opening operation.

8. The portable terminal of claim 3, further comprising:
a flexible cable that electrically connects between the first housing and the second housing, wherein one end of the flexible cable is fixedly connected in the first housing, and the other end of the flexible cable is fixedly connected to the second housing, and an intermediate point of the flexible cable is fixed to a predetermined position of at least one of the first and second arm members.

9. The portable terminal of claim 1, wherein
the hinge portion rotatably couples the first housing and the second housing such that both the first and second displays are exposed to the outside in a closed state and the first and second display screens are positioned adjacent to each other in substantially the same plane in the open state.

10. The portable terminal of claim 1, wherein
at least the second display portion includes a touch panel having a touch region that overlaps the entirety or a part of the second display.

11. The portable terminal of claim 1, wherein
the hinge portion includes a reverse opening prevention mechanism that restricts the amount of opening by which the opposing end portions are opened away from each other with respective free end portions of the first housing and the second housing opposite to the opposing end portions kept closed in a closed state.

12. The portable terminal of claim 1, further comprising:
a reverse torque generation mechanism provided with a first elastic member formed from a coil spring, wherein the drawing mechanism is provided with a second elastic member formed from a coil spring, and the first elastic member and the second elastic member have different diameters, and one of the elastic members is internally contained in a space occupied by the other elastic member.

13. The portable terminal of claim 1, further comprising:
circuitry configured to determine whether the first and second housings are in the open state or a closed state.

14. The portable terminal of claim 13, wherein
the circuitry is configured to activate the first and second displays when it is determined that the first and second housings are in the open state.

15. The portable terminal of claim 13, wherein
the circuitry is configured to activate the first display and deactivate the second display when the first and second housing are in the closed state.

16. The portable terminal of claim 13, further comprising:
a first touch panel having a touch region that overlaps the entirety or a part of the first display; and
a second touch panel having a touch region that overlaps the entirety or a part of the second display.

17. The portable terminal of claim 16, wherein
the circuitry is configured to activate the first and second displays and the first and second touch panels when it is determined that the first and second housings are in the open state.

18. The portable terminal of claim 16, wherein
the circuitry is configured to activate the first display and the first touch panel and deactivate the second display and the second touch panel when it is determined that the first and second housings are in the closed state.

19. The portable terminal of claim 16, wherein
the circuitry is configured to activate the first display, the first touch panel and the second touch panel and deactivate the second display when it is determined that the first and second housings are in the closed state.

20. A portable terminal including:
a first housing;
a second housing;
a hinge portion that couples the first housing and the second housing so as to be openable and closable; and
a flexible cable that electrically connects between the first housing and the second housing, wherein
the hinge portion includes at least one arm member and a slide member, and
a first intermediate point of the flexible cable is fixed to a predetermined position of the one arm member, and a second intermediate point of the flexible cable is fixed to a predetermined position of the slide member.

21. A portable terminal including:
a first housing including a display;
a second housing including the display; and
a hinge portion that couples the first housing and the second housing so as to be openable and closable with respective opposing end portions of the first housing and the second housing adjacent to each other and with respective surfaces of the first housing and the second housing positioned in the same plane as each other in an open state, wherein
the hinge portion is disposed so as to not be visible from a front side of the first housing and the second housing when the first housing and the second housing are in the open state, wherein
the hinge portion includes a drawing mechanism that generates a drawing force for bringing the opposing end portion of the second housing closer to the opposing end portion of the first housing when the first housing and the second housing are within a predetermined range proximate to a closed state.

* * * * *